(12) United States Patent
Sendai et al.

(10) Patent No.: US 10,114,604 B2
(45) Date of Patent: Oct. 30, 2018

(54) HEAD-MOUNTED DISPLAY DEVICE, CONTROL METHOD FOR HEAD-MOUNTED DISPLAY DEVICE, AND COMPUTER PROGRAM

(71) Applicant: SEIKO EPSON CORPORATION, Tokyo (JP)

(72) Inventors: Kaori Sendai, Okaya (JP); Akira Suzuki, Matsumoto (JP); Fusashi Kimura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 151 days.

(21) Appl. No.: 14/963,907

(22) Filed: Dec. 9, 2015

(65) Prior Publication Data
US 2016/0188283 A1    Jun. 30, 2016

(30) Foreign Application Priority Data
Dec. 26, 2014  (JP) ................. 2014-264142

(51) Int. Cl.
*G06F 3/16* (2006.01)
*G02B 27/01* (2006.01)
*G02B 27/00* (2006.01)

(52) U.S. Cl.
CPC ........... *G06F 3/16* (2013.01); *G02B 27/0093* (2013.01); *G02B 27/0172* (2013.01); *G06F 3/167* (2013.01); *G02B 2027/014* (2013.01)

(58) Field of Classification Search
CPC ....... G06F 3/16; G06F 3/167; G02B 27/0093; G02B 27/0172; G02B 2027/014
See application file for complete search history.

(56) References Cited

U.S. PATENT DOCUMENTS

| 2003/0117365 A1 | 6/2003 | Shteyn |
| 2006/0036970 A1 | 2/2006 | Rich et al. |
| 2008/0120106 A1 | 5/2008 | Izumida et al. |
| 2008/0162144 A1* | 7/2008 | Kuchibhotla ........... G06F 3/018 704/275 |

(Continued)

FOREIGN PATENT DOCUMENTS

| JP | 2002-132804 A | 5/2002 |
| JP | 2005-512226 A | 4/2005 |

(Continued)

*Primary Examiner* — Peter D McLoone
(74) *Attorney, Agent, or Firm* — Oliff PLC

(57) ABSTRACT

A transmission type head-mounted display device includes a sound acquiring unit configured to acquire sound on the outside, a sound identifying unit configured to identify specific sound in the acquired sound, an image display unit capable of displaying an image and capable of transmitting an outside scene, an image storing unit configured to store an execution function image representing a function executable by the head-mounted display device and a specific sound image associated with the specific sound, a display-image setting unit configured to cause the image display unit to display a combined image obtained by combining the execution function image and the specific sound image, and a function executing unit configured to execute a function corresponding to the execution function image combined with the specific sound image associated with the acquired specific sound.

15 Claims, 14 Drawing Sheets

(56) References Cited

U.S. PATENT DOCUMENTS

| | | | |
|---|---|---|---|
| 2011/0001695 A1 | 1/2011 | Suzuki et al. | |
| 2011/0016895 A1 | 1/2011 | Sishtla | |
| 2012/0236025 A1* | 9/2012 | Jacobsen | G06F 3/011 |
| | | | 345/629 |
| 2015/0138081 A1 | 5/2015 | Iwatsu et al. | |
| 2016/0034042 A1* | 2/2016 | Joo | G02B 27/0172 |
| | | | 345/633 |

FOREIGN PATENT DOCUMENTS

| | | |
|---|---|---|
| JP | 2006-072992 A | 3/2006 |
| JP | 2008-129412 A | 6/2008 |
| JP | 2011-014082 A | 1/2011 |
| JP | 2012-215673 A | 11/2012 |
| JP | 2014-035668 A | 2/2014 |
| WO | 2014/129105 A1 | 8/2014 |

* cited by examiner

HEAD-MOUNTED DISPLAY DEVICE, CONTROL METHOD FOR HEAD-MOUNTED DISPLAY DEVICE, AND COMPUTER PROGRAM

BACKGROUND

1. Technical Field

The present invention relates to a technique of a head-mounted display device.

2. Related Art

A head-mounted display device (a head mounted display (HMD)), which is a display device mounted on a head, is known. For example, the head-mounted display device generates image light using a liquid crystal display and a light source and guides the generated image light to the eyes of a user using projection optical systems and light guide plates to thereby cause the user to visually recognize a virtual image. As the head-mounted display device, there are two types, i.e., a transmission type with which the user can visually recognize an outside scene in addition to the virtual image and a non-transmission type with which the user cannot visually recognize the outside scene. As the head-mounted display device of the transmission type, there are an optical transmission type and a video transmission type.

JP-A-2012-215673 (Patent Literature 1) describes a technique for switching information processing performed by an information processing apparatus according to intonation of voice serving as a form of an utterance. JP-A-2008-129412 (Patent Literature 2) describes an electronic apparatus that, after transmitting a control signal indicating announcement of sound to be output, adjusts timing of the output of the announced sound and outputs the sound. JP-A-2002-132804 (Patent Literature 3) discloses a technique with which an agent responds to, with registered content, content of an utterance of a specified user in a system including a server having stored therein contents of utterances of users registered in advance and contents of responses based on the contents of the utterances of the users. JP-A-2006-72992 (Patent Literature 4) describes a technique for displaying, as a text image, content of a response stored in advance to correspond to an utterance of a specified user in a system network including home electric appliances.

However, in the technique described in Patent Literature 1, when the processing is changed according to only the intonation of the voice, it is likely that the intonation of the voice is not correctly identified. In the techniques described in Patent Literatures 2 and 3, it is likely that a response intended by a user is not obtained. In the network described in Patent Literature 4, an image display unit, on which a character image is displayed, and an outside scene, which is an actual scene, are separately visually recognized by a user. There is no relation between the character image and the outside scene. Therefore, there is room of improvement in convenience of use of the network. Besides, in a technique of a head-mounted display device in the past, there has been a demand for a reduction in the size, a reduction in the costs, and the like of the head-mounted display device.

SUMMARY

An advantage of some aspects of the invention is to solve at least a part of the problems described above, and the invention can be implemented as the following aspects.

(1) An aspect of the invention provides a transmission type head-mounted display device. The head-mounted display device of this aspect includes: a sound acquiring unit configured to acquire sound on the outside; a sound identifying unit configured to identify specific sound in the acquired sound; an image display unit capable of displaying an image and capable of transmitting an outside scene; an image storing unit configured to store an execution function image representing a function executable by the head-mounted display device and a specific sound image associated with the specific sound; a display-image setting unit configured to cause the image display unit to display a combined image obtained by combining the execution function image and the specific sound image; and a function executing unit configured to execute a function corresponding to the execution function image combined with the specific sound image associated with the acquired specific sound. With the head-mounted display device of this aspect, according to specific sounds corresponding to specific sound images smaller in number than types of functions to be executed, processing corresponding to the specific sounds is performed. Therefore, accuracy of sound identification is improved. Since the number of specific sound images is limited, it is possible to execute a function by sound of a short word. Convenience of use of the head-mounted display device is improved.

(2) In the head-mounted display device of the aspect, the display-image setting unit may cause the image display unit to display a plurality of the combined images as a selection group image. With the head-mounted display device of this aspect, the execution function image that can execute a plurality of functions on one display screen is displayed on the image display unit. Convenience of use for the user is improved.

(3) In the head-mounted display device of the aspect, a function executed by the head-mounted display device may be an intermediate function for enabling selection of a plurality of functions associated with the function to be executed. When the intermediate function is executed, the display-image setting unit may cause the image display unit to display a plurality of the execution function images representing the plurality of functions associated with the executed intermediate function and the combined image obtained by combining each of the plurality of execution function images and the specific sound image. With the head-mounted display device of this aspect, the convenience of use for the user is further improved.

(4) In the head-mounted display device of the aspect, the head-mounted display device may further include a motion detecting unit configured to detect a motion of the user, and the function executing unit may select, on the basis of a combination of the detected motion of the user and the acquired specific sound, the execution function image displayed on the image display unit. With the head-mounted display device of this aspect, in the determination of the function to be executed, not only the sound but also the motion of the user is added. Therefore, the user can sensibly easily operate the head-mounted display device. The convenience of use for the user is improved.

(5) In the head-mounted display device of the aspect, the operation detecting unit may detect a motion of the head of the user. With the head-mounted display device of this aspect, in the determination of the function to be executed, not only the sound but also the motion of the head of the user is added. Therefore, the user can sensibly easily operate the head-mounted display device. The convenience of use for the user is improved.

(6) In the head-mounted display device of the aspect, the specific sound image may be an image having a region displayed on the image display unit smaller than a region of the execution function image. With the head-mounted display device of this aspect, a useless image unrelated to execution of a function is not unnecessarily displayed on the image display unit. The user can easily recognize content to be executed when selected. Convenience for the user is improved.

(7) In the head-mounted display device of the aspect, the specific sound image may be one of an image representing a direction and an image displayed in a color different from a color of another kind of the specific sound image. With the head-mounted display device of the aspect, it is possible to further improve the accuracy of the sound identification.

(8) In the head-mounted display device of the aspect, when a different plurality of the combined images are displayed on the image display unit, each of specific sound images combined with each of the plurality of images may be unrelated to a function of the head-mounted display device to be executed and may be formed by different words included in the same category. With the head-mounted display device of this aspect, it is possible to prevent the user from selecting an unintended execution function image by mistake from the plurality of execution function images displayed on the image display unit in parallel.

(9) In the head-mounted display device of the aspect, the head-mounted display device may further include a communication unit capable of transmitting and receiving information to and from another device, the execution function image may include another device control image representing a function executable by the other device capable of transmitting and receiving the information, and the function executing unit may cause the other device to execute a function executable by the other device control image combined with the specific sound image associated with the acquired specific sound. With the head-mounted display device of this aspect, the user can also execute a function other than the head-mounted display device present in a remote position. The convenience for the user is improved.

(10) In the head-mounted display device of the aspect, the display-image setting unit may cause the image display unit to display the combined image in a region excluding the center in an image display region where the image display unit can display an image. With the head-mounted display device of this aspect, the visual field of the user is not unnecessarily narrowed. The convenience for the user is improved.

(11) In the head-mounted display device of the aspect, the function executing unit may cause the head-mounted display device to execute a function executable by the execution function image combined with the specific sound image associated with the acquired specific sound. With the head-mounted display device of this aspect, according to specific sounds corresponding to specific sound images smaller in number than types of functions to be executed, a function to be executed by the head-mounted display device is determined. Therefore, accuracy of sound identification is improved.

Not all of a plurality of constituent elements of the aspects of the invention are essential. To solve a part or all of the problems or to attain apart or all of the effects described in this specification, concerning a part of the plurality of constituent elements, it is possible to appropriately perform a change, deletion, replacement with new other constituent elements, and partial deletion of limited contents. To solve a part or all of the problems or to attain a part or all of the effects described in this specification, it is also possible to combine a part or all of the technical features included in one aspect of the invention with a part or all of the technical features included in the other aspects of the invention to obtain an independent aspect of the invention.

For example, an aspect of the invention can be implemented as a device including one or two or more of the six elements, i.e., the sound acquiring unit, the sound identifying unit, the image display unit, the image storing unit, the display-image setting unit, and the function executing unit. That is, the device may or may not include the sound acquiring unit. The device may or may not include the sound identifying unit. The device may or may not include the image display unit. The device may or may not include the image storing unit. The device may or may not include the display-image setting unit. The device may or may not include the function executing unit. For example, the sound acquiring unit may acquire sound on the outside. For example, the sound identifying unit may identify specific sound in the acquired sound. For example, the image display unit may be capable of displaying an image and may be capable of transmitting an outside scene. For example, the image storing unit may store an execution function image representing a function executable by the head-mounted display device and a specific sound image associated with the specific sound. For example, the display-image setting unit may cause the image display unit to display a combined image obtained by combining the execution function image and the specific sound image. For example, the function executing unit may execute a function corresponding to the execution function image combined with the specific sound image associated with the acquired specific sound. Such a device can be implemented as, for example, a head-mounted display device but can also be implemented as devices other than the head-mounted display device. According to such an aspect, it is possible to attain at least one of various objects such as improvement and simplification of operability of the device, integration of the device, and improvement of convenience for a user who uses the device. A part or all of the technical features of the aspects of the head-mounted display device explained above can be applied to the device.

The invention can also be implemented in various forms other than the head-mounted display device. For example, the invention can be implemented in forms such as a control method for the head-mounted display device, a system including the head-mounted display device, a computer program for implementing the control method for the head-mounted display device and the system including the head-mounted display device, a recording medium having the computer program recorded therein, and a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of an Information System

Figure 1:
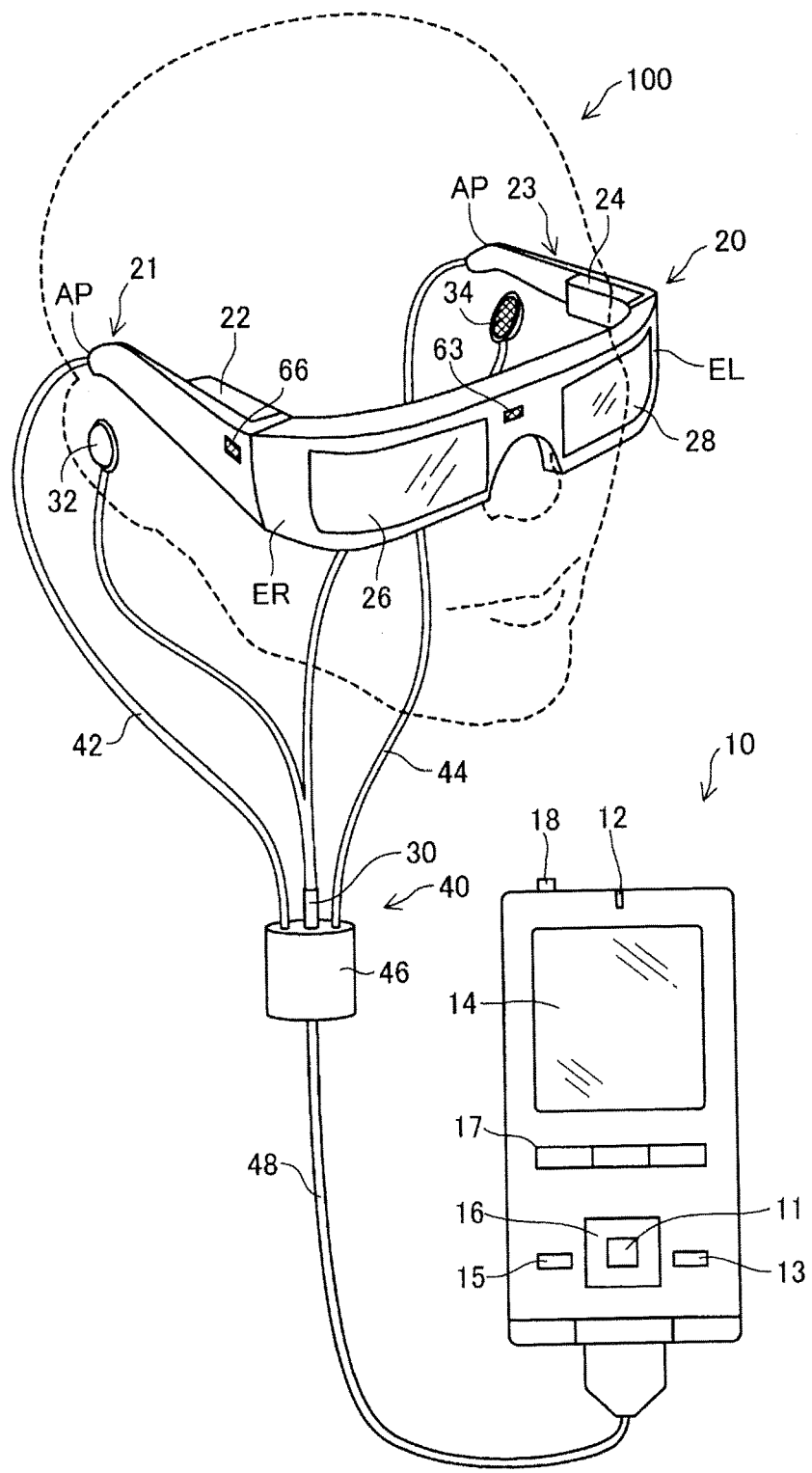
FIG. 1 is an explanatory diagram showing the exterior configuration of a head-mounted display device (an HMD).

FIG. 1 is an explanatory diagram showing the exterior configuration of a head-mounted display device 100 (an HMD 100).

The head-mounted display device 100 is a device mounted on a head and is called a head mounted display (HMD) as well. The HMD 100 in this embodiment is an optical transmission type head-mounted display device with which a user can visually recognize a virtual image and at the same time directly visually recognize an outside scene. Note that, in this specification, the virtual image visually recognized by the user using the HMD 100 is referred to as "display image" as well for convenience.

The HMD 100 includes an image display unit 20 that causes the user to visually recognize the virtual image in a state in which the image display unit 20 is worn on the head of the user and a control unit 10 (a controller 10) that controls the image display unit 20.

The image display unit 20 is a wearing body worn on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, a microphone 63, and a ten-axis sensor 66. The right optical-image display unit 26 and the left optical-image display unit 28 are disposed to be respectively located in front of the right eye and in front of the left eye of the user when the user wears the image display unit 20. One end of the right optical-image display unit 26 and one end of the left optical-image display unit 28 are connected to each other in a position corresponding to the middle of the forehead of the user when the user wears the image display unit 20.

The right holding unit 21 is a member provided to extend from an end portion ER, which is the other end of the right optical-image display unit 26, to a position corresponding to the temporal region of the user when the user wears the image display unit 20. Similarly, the left holding unit 23 is a member provided to extend from an end portion EL, which is the other end of the left optical-image display unit 28, to a position corresponding to the temporal region of the user when the user wears the image display unit 20. The right holding unit 21 and the left holding unit 23 hold the image display unit 20 on the head of the user like temples of eyeglasses.

The right display driving unit 22 and the left display driving unit 24 are disposed on sides opposed to the head of the user when the user wears the image display unit 20. Note that, in the following explanation, the right holding unit 21 and the left holding unit 23 are collectively simply referred to as "holding unit" as well. The right display driving unit 22 and the left display driving unit 24 are collectively simply referred to as "display driving units" as well. The right optical-image display unit 26 and the left optical-image display unit 28 are collectively simply referred to as "optical-image display units" as well.

The display driving units 22 and 24 include liquid crystal displays 241 and 242 (hereinafter referred to as "LCDs 241 and 242" as well) and projection optical systems 251 and 252 (see FIG. 2). Details of the configuration of the display driving units 22 and 24 are explained below. The optical-image display units 26 and 28 functioning as optical members include light guide plates 261 and 262 (see FIG. 2) and dimming plates. The light guide plates 261 and 262 are formed of a light-transmissive resin material or the like and guide image lights output from the display driving units 22 and 24 to the eyes of the user. The dimming plates are thin plate-like optical elements and are disposed to cover the front side of the image display unit 20, which is a side opposite to the side of the eyes of the user. The dimming plates protect the light guide plates 261 and 262 and suppress damage, adhesion of stain, and the like to the light guide plates 261 and 262. By adjusting the light transmittance of the dimming plate, it is possible to adjust an amount of external light entering the eyes of the user and adjust easiness of visual recognition of a virtual image. Note that the dimming plates can be omitted.

The microphone 63 acquires sound on the outside. The microphone 63 is disposed on the opposite side (the outer side) of a side opposed to the user in the right display driving unit 22 when the user wears the image display unit 20. The ten-axis sensor 66 is a sensor that detects acceleration (three axes), angular velocity (three axes), terrestrial magnetism (three axes), and atmospheric pressure (one axis).

The ten-axis sensor 66 is incorporated near the right display driving unit 22 in the image display unit 20. When the image display unit 20 is worn on the head of the user, the ten-axis sensor 66 detects the movement and the position of the head of the user. Note that, in this embodiment, the ten-axis sensor 66 that detects terrestrial magnetism and the like as well is used in order to specify the direction of the head of the user. However, in other embodiments, a gyro sensor that detects only angular velocity (three axes) may be used instead of the ten-axis sensor 66.

The image display unit 20 further includes a connecting unit 40 for connecting the image display unit 20 to the control unit 10. The connecting unit 40 includes a main body cord 48 connected to the control unit 10, a right cord 42, a left cord 44, and a coupling member 46. The right cord 42 and the left cord 44 are two cords branching from the main body cord 48. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24. The coupling member 46 is provided in a branching point of the main body cord 48 and the right and left cords 42 and 44 and includes a jack for connecting an earphone plug 30. A right earphone 32 and a left earphone 34 extend from the earphone plug 30.

The image display unit 20 and the control unit 10 transmit various signals via the connecting unit 40. Connectors (not shown in the figure), which fit with each other, are respectively provided at an end portion on the opposite side of the coupling member 46 in the main body cord 48 and in the control unit 10. The control unit 10 and the image display unit 20 can be connected and disconnected by fitting and unfitting the connector of the main body cord 48 and the connector of the control device 10. As the right cord 42, the left cord 44, and the main body cord 48, for example, a metal cable and an optical fiber can be adopted.

The control unit 10 is a device for controlling the HMD 100. The control unit 10 includes a determination key 11, a lighting unit 12, a display switching key 13, a track pad 14, a luminance switching key 15, a direction key 16, a menu key 17, and a power switch 18. The determination key 11 detects pressing operation and outputs a signal for determining content of the operation in the control unit 10. The lighting unit 12 notifies, with a light emission state thereof, an operation state of the HMD 100. Example of the operation state of the HMD 100 include ON/OFF of a power supply. As the lighting unit 12, for example, an LED is used. The display switching key 13 detects pressing operation and outputs, for example, a signal for switching a display mode of a content moving image to 3D and 2D. The track pad 14 detects operation by a finger of the user on an operation surface of the track pad 14 and outputs a signal corresponding to detection content. As the track pad 14, various track pads such as an electrostatic type, a pressure detection type, and an optical type can be adopted. The luminance switching key 15 detects pressing operation and outputs a signal for increasing or reducing the luminance of the image display unit 20. The direction key 16 detects pressing operation on keys corresponding to the upward, downward, left, and right directions and outputs a signal corresponding to detection content. The power switch 18 detects slide operation of the switch to switch a power supply state of the HMD 100.

Figure 2:
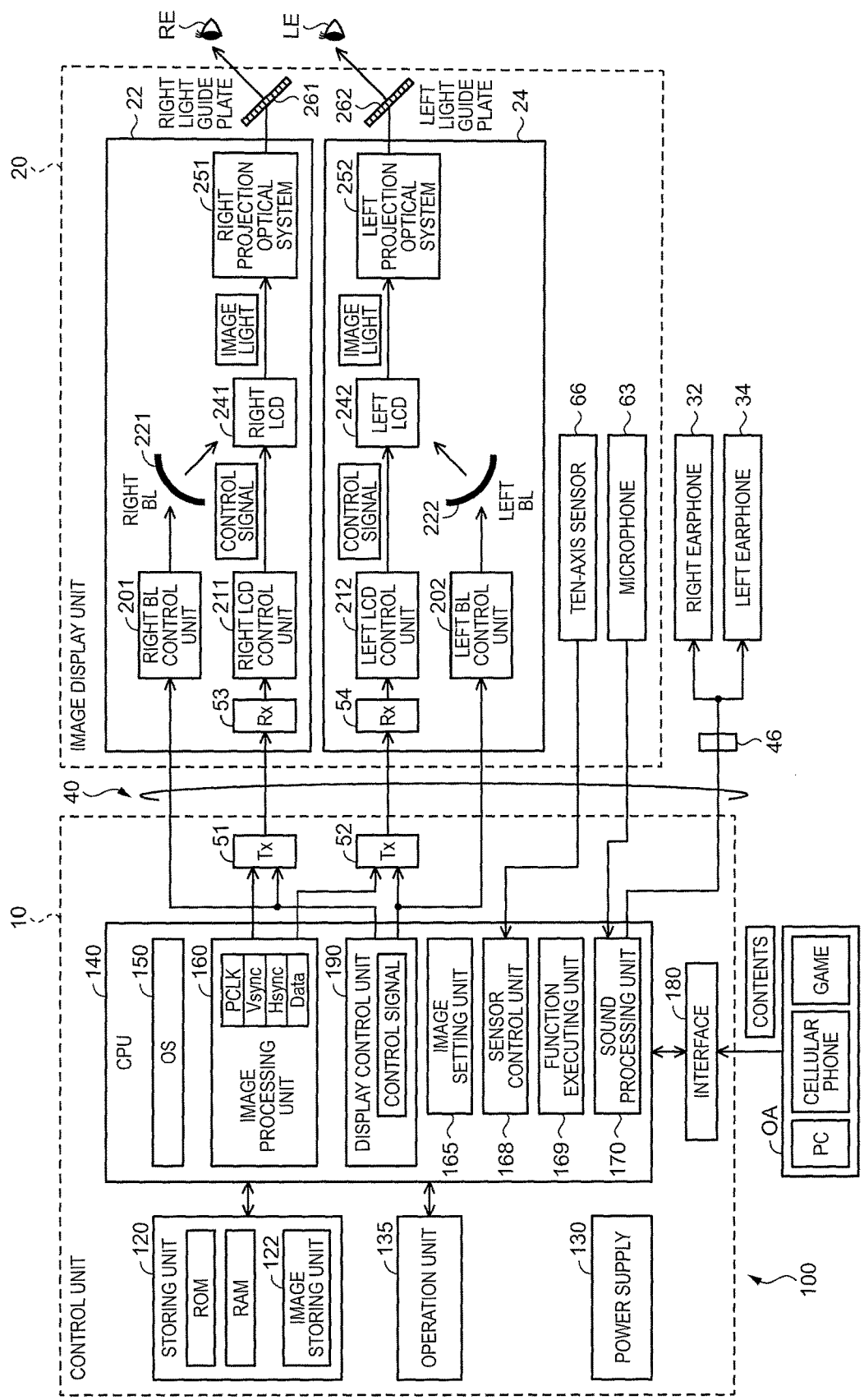
FIG. 2 is a block diagram showing the configuration of the HMD in terms of functions.

FIG. 2 is a block diagram showing the configuration of the HMD 100 in terms of functions. As shown in FIG. 2, the control unit 10 includes a storing unit 120, a power supply 130, an operation unit 135, a CPU 140, an interface 180, and a transmitting unit 51 (Tx 51) and a transmitting unit 52 (Tx 52). The operation unit 135 receives operation by the user. The operation unit 135 is configured from the determination key 11, the display switching key 13, the track pad 14, the luminance switching key 15, the direction key 16, the menu key 17, and the power switch 18.

The power supply 130 supplies electric power to the units of the HMD 100. As the power supply 130, for example, a secondary battery can be used.

The storing unit 120 includes a ROM having stored therein computer programs, a RAM used when the CPU 140 executes write and read of various computer programs, and an image storing unit 122. The image storing unit 122 divides functions executable by the HMD 100 into layers and stores the functions and also stores images respectively associated with the functions. Details of the functions divided into the layers and stored by the image storing unit 122 are explained below.

The CPU 140 reads out a computer program stored in the ROM of the storing unit 120 and executes write and read in the RAM of the storing unit 120 to thereby function as an operating system 150 (OS 150), a display control unit 190, a sound processing unit 170, an image processing unit 160, a sensor control unit 168, a function executing unit 169, and an image setting unit 165.

The display control unit 190 generates a control signal for controlling the right display driving unit 22 and the left display driving unit 24. Specifically, the display control unit 190 individually controls, with control signals, ON/OFF of driving of the right LCD 241 by a light LCD control unit 211, ON/OFF of driving of a right backlight 221 by a right backlight control unit 201, ON/OFF of driving of the left LCD 242 by a left LCD control unit 212, ON/OFF of driving of a left backlight 222 by a left backlight control unit 202, and the like. Consequently, the display control unit 190 controls generation and emission of image light by each of the right display driving unit 22 and the left display driving unit 24. For example, the display control unit 190 causes both of the right display driving unit 22 and the left display driving unit 24 to generate image lights, causes only one of the right display driving unit 22 and the left display driving unit 24 to generate image light, or does not cause both of the right display driving unit 22 and the left display driving unit 24 to generate image lights. Note that generating image light is referred to as "display an image" as well.

The display control unit 190 transmits control signals respectively to a right LCD control unit 211 and the left LCD control unit 212 via the transmitting units 51 and 52. The display control unit 190 transmits control signals respectively to the right backlight control unit 201 and the left backlight control unit 202.

The image processing unit 160 acquires an image signal included in contents and transmits the acquired image signal to receiving units 53 and 54 of the image display unit 20 via the transmitting units 51 and 52. Note that the image processing unit 160 may execute, on image data, image processing such as resolution conversion processing, various color tone correction processing such as adjustment of luminance and chroma, and keystone correction processing according to necessity.

The sound processing unit 170 acquires a sound signal included in contents, amplifies the acquired sound signal, and supplies the sound signal to a speaker (not shown in the figure) in the right earphone 32 and a speaker (not shown in the figure) in the left earphone 34 connected to the coupling member 46. Note that, for example, when a Dolby (registered trademark) system is adopted, processing for the sound signal is performed and different sounds with frequencies or the like varied are output respectively from the right earphone 32 and the left earphone 34. The sound processing unit 170 applies various kinds of processing to sound on the outside acquired by the microphone 63 to identify the sound. The sound processing unit 170 can convert the acquired sound into characters. Note that the sound processing unit 170 corresponds to the sound identifying unit in the appended claims. The sound processing unit 170 and the microphone 63 correspond to the sound acquiring unit in the appended claims.

The sensor control unit 168 detects a change in the head of the user on the basis of angular velocity detected by the ten-axis sensor 66. Note that the ten-axis sensor 66 and the sensor control unit 168 correspond to the operation detecting unit in the appended claims.

The image setting unit 165 causes, on the basis of at least one of the sound identified by the sound processing unit 170, the detected change in the head of the user, and operation received by the operation unit 135, the image display unit 20 to display an image stored in the image storing unit 122. Note that, in the following explanation, unless particularly limited, operation includes sound identification by the sound processing unit 170, a detected change in the head, and operation received by the operation unit 135 and includes all concepts serving as a trigger of execution of the function executing unit 169.

After an image is displayed by the image display unit 20, when operation (including sound identification and the like) associated with the displayed image is received, the function executing unit 169 causes the HMD 100 to execute a function executable by the HMD 100 corresponding to the received operation.

Figure 3:
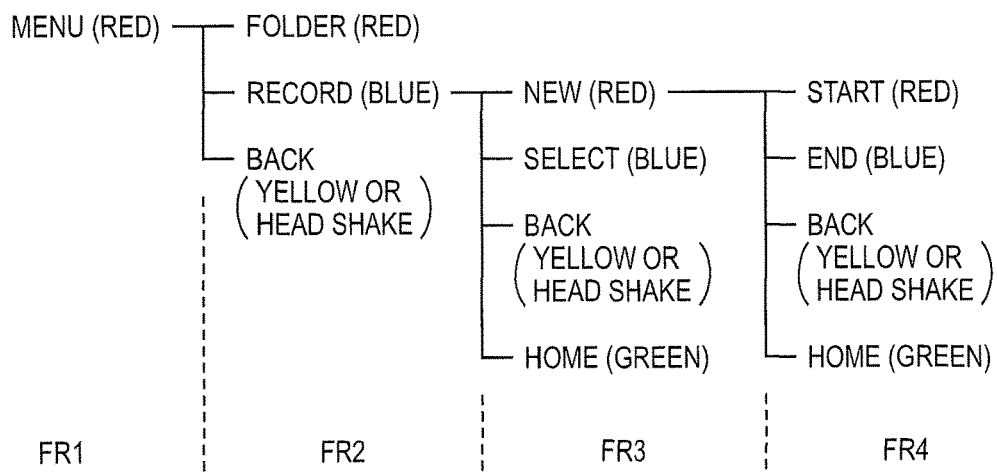
FIG. 3 is a schematic diagram showing a correspondence relation among functions executable by the HMD divided for each of layers in an image storing unit.

FIG. 3 is a schematic diagram showing a correspondence relation among functions executable by the HMD 100 divided into each of layers in the image storing unit 122. In FIG. 3, a correspondence relation among stored functions in a hierarchical structure is shown. In FIG. 3, as one of the functions executable by the HMD 100, a correspondence relation among functions divided into four layers until execution of a function of sound recording for recording sound on the outside is shown. Specific images are associated with the respective functions in advance. In this embodiment, as the images associated with the respective functions, images obtained by representing, as character images, functions executed when the images are selected are used. However, in other embodiments, images other than the character images may be used.

When the function executing unit 169 receives predetermined operation, the image setting unit 165 causes the image display unit 20 to display an image associated with a function of "Menu" stored in a first layer FR1, which is a top layer among the layers of the image storing unit 122. In this case, the image setting unit 165 combines an image created with a red color associated with acquired specific sound "aka" with an image of "Menu". Details of an image (e.g., FIGS. 6 and 7) obtained by combining the image of "Menu" and the image created in red are explained blow in function execution processing.

When "Menu" of the first layer FR1 is selected according to the reception of the predetermined operation, the image setting unit 165 causes the image display unit 20 to display an image representing a function stored in a second layer FR2 in association with "Menu". In this case, the image setting unit 165 causes the image display unit 20 to display, in combination with the image created in red, "Folder" for displaying a folder list stored in a lower layer when selected, display, in combination with an image created in blue, "Record" for recording sound on the outside acquired by the microphone 63 when selected, and display, in combination with an image created in yellow, "Back" for returning to immediately above layer when selected. That is, when "Menu" is selected, the function executing unit 169 causes the image display unit 20 to display, as an image, the function stored in the immediately below second layer FR2, which is a function associated with "Menu". Note that "Back" is associated with the image created in yellow and is also associated with a change in the head of the user detected by the ten-axis sensor 66. When a head shake in the horizontal direction of the user is detected by the ten-axis sensor 66, the function associated with "Back" is also executed. In this embodiment, the three images are displayed on the image display unit 20. However, another image may be displayed on the image display unit 20. Images less than three may be displayed on the image display unit 20. In FIG. 3, in the second layer FR2, "Record" is selected by operation. Note that images such as "Menu" and "Folder" correspond to the execution function image in the appended claims. Sounds "aka" and "ao" correspond to the specific sound in the appended claims. The image created in red combined with the execution function image of "Menu" and the image created in blue combined with the execution function image of "Record" correspond to the specific sound image in the appended claims.

When "Record" is selected in the second layer FR2, the image setting unit 165 causes the image display unit 20 to display, as a character image, a function stored in an third layer FR3 immediately below the second layer FR2, which is a function of "Record". In this case, the image setting unit 165 causes the image display unit 20 to display, in combination with the image created in red, an image of New for creating anew file when selected, display, in combination with the image created in blue, an image of "Select" for selecting a file created previously when selected, display, in combination with the image created in yellow, an image of "Back", and display, in combination with an image created in green, "Home" for returning to the top first layer FR1 when selected. In FIG. 3, in the third layer FR3, "New" is selected.

When New is selected in the third layer FR3, as a function of "New", the image setting unit 165 causes the image display unit 20 to display, as an image, a function stored in a fourth layer FR4 immediately below the third layer FR3. In this case, the image setting unit 165 causes the image display unit 20 to display, in combination with the image created in red, an image of "Start" for starting sound recording when selected, display, in combination with the image created in blue, an image of "End" for ending the sound recording when selected, display, in combination with the image created in yellow, the image of "Back", and display, in combination with the image created in green, the image of "Home". As explained above, the images stored in the image storing unit 122 are associated with the colors, which are short words, as sounds. Therefore, an error in selection by sound identification is reduced. Since the images associated with the same color are present in the respective layers stored in the image storing unit 122, when performing the sound identification, the sound processing unit 170 does not have to compare acquired sound and a plurality of words registered in advance. The accuracy of sound identification is further improved.

As shown in FIG. 2, the image display unit 20 includes the right display driving unit 22, the left display driving unit 24, the right light guide plate 261 functioning as the right optical-image display unit 26, the left light guide plate 262 functioning as the left optical-image display unit 28, the microphone 63, and the ten-axis sensor 66.

The right display driving unit 22 includes the receiving unit (Rx) 53, the right backlight (BL) control unit 201 (the right BL control unit 201) and the right backlight (BL) 221 (the right BL 221) functioning as a light source, the right LCD control unit 211 and the right LCD 241 functioning as a display device, and a right projection optical system 251. The right backlight control unit 201 and the right backlight 221 function as the light source. The right LCD control unit 211 and the right LCD 241 function as the display device. Note that the right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is a light emitting body such as an LED or an electroluminescence (EL) device. The right LCD control unit 211 drives the right LCD 241 on the basis of a clock signal PCLK, a vertical synchronization signal VSync, a horizontal synchronization signal HSync, image data for the right eye input via the receiving unit 53. The right LCD 241 is a transmission liquid crystal panel on which a plurality of pixels are arranged in a matrix shape.

The right projection optical system 251 is configured by a collimate lens that changes image light emitted from the right LCD 241 to light beams in a parallel state. The right light guide plate 261 functioning as the right optical-image display unit 26 guides image light output from the right projection optical system 251 to a right eye RE of the user while reflecting the image light along a predetermined optical path. Note that the right projection optical system 251 and the right light guide plate 261 are collectively referred to as "light guide unit" as well.

The left display driving unit 24 includes a configuration same as the configuration of the right display driving unit 22. The left display driving unit 24 includes the receiving unit 54 (Rx 54), the left backlight control unit 202 (the left BL control unit 202) and the left backlight 222 (the left BL 222) functioning as a light source, the left LCD control unit 212 and the left LCD 242 functioning as a display device, and a left projection optical system 252. The left backlight control unit 202 and the left backlight 222 function as the light source. The left LCD control unit 212 and the left LCD 242 function as the display device. Note that the left backlight control unit 202, the left LCD control unit 212, the left backlight 222, and the left LCD 242 are collectively referred to as "image-light generating unit" as well. The left projection optical system 252 is configured by a collimate lens that changes image light emitted from the left LCD 242 to light beams in a parallel state. The left light guide plate 262 functioning as the left optical-image display unit 28 guides image light output from the left projection optical system 252 to a left eye LE of the user while reflecting the image light along a predetermined optical path. Note that the left projection optical system 252 and the left light guide plate 262 are collectively referred to as "light guide unit" as well.

Figure 4:
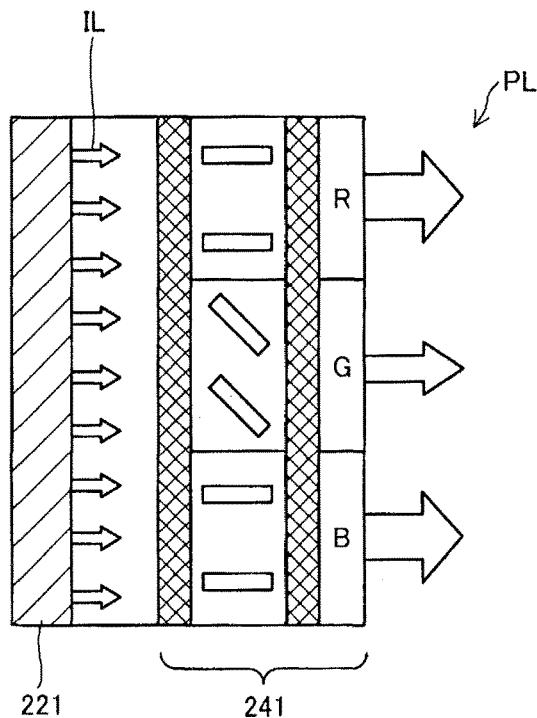
FIG. 4 is an explanatory diagram showing a state in which image light is emitted by an image-light generating unit.

FIG. 4 is an explanatory diagram showing a state in which image light is emitted by the image-light generating unit. The right LCD 241 drives liquid crystal in pixel positions arranged in a matrix shape to thereby change the transmittance of light transmitted through the right LCD 241 to modulate illumination light IL irradiated from the right backlight 221 into effective image light PL representing an image. The same applies to the left side. Note that, as shown in FIG. 4, a backlight system is adopted in this embodiment. However, image light may be emitted using a front light system and a reflection system.

A-2. Function Execution Processing

Figure 5:
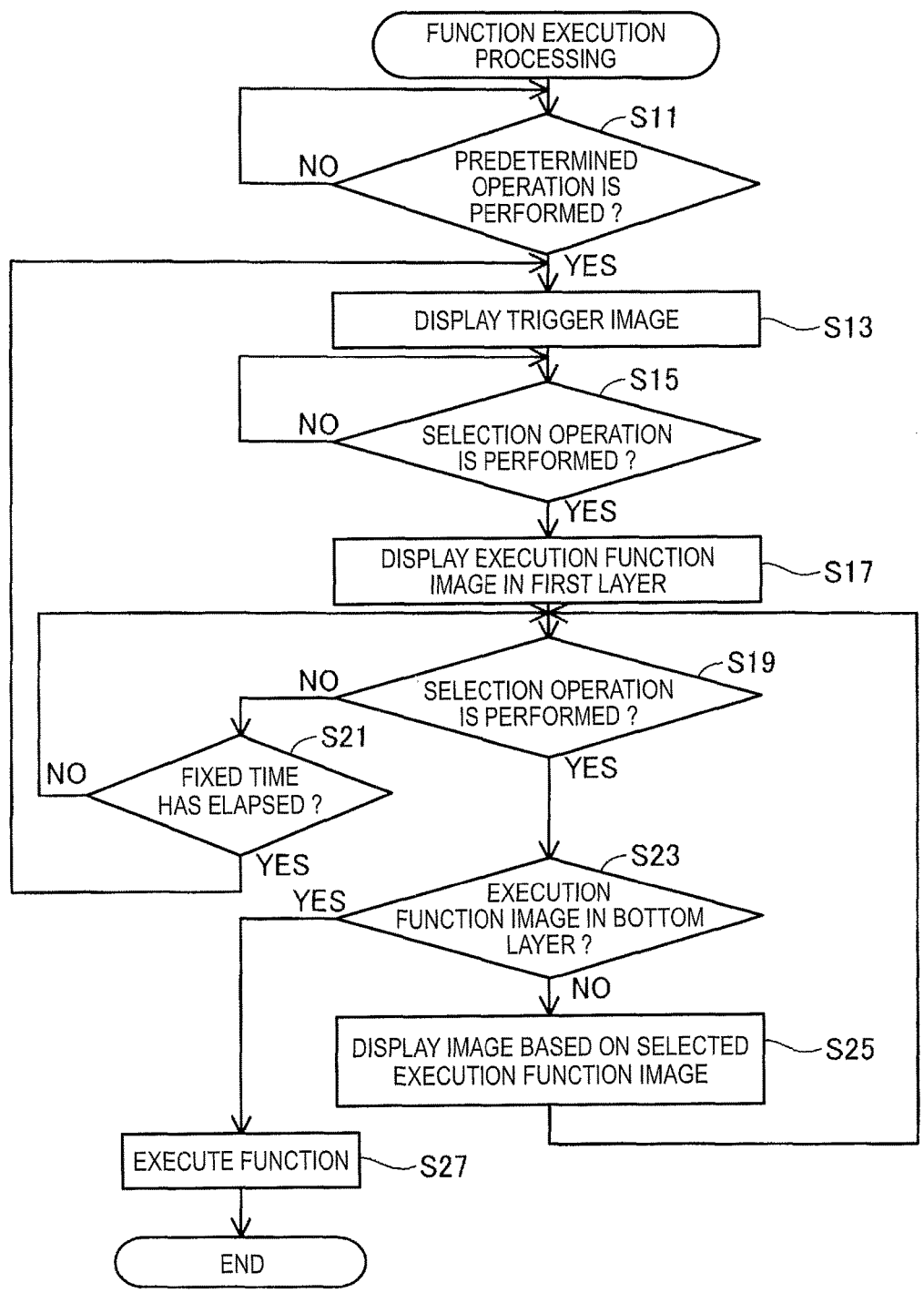
FIG. 5 is a flowchart of function execution processing.

FIG. 5 is a flowchart of function execution processing. The function execution processing is processing in which the CPU 140 executes functions mounted on the HMD 100 on the basis of received operation. In particular, in this embodiment, when the microphone 63 acquires sound (color "red", etc.) associated with a function to be executed (e.g., sound recording), a function corresponding to an execution function image combined with a specific sound image associated with the acquired sound is performed by the function executing unit 169. Therefore, in the function execution processing explained in this embodiment, the operation received by the control unit is limited to sound on the outside identified by the microphone 63 and the sound processing unit 170. However, in other embodiments, functions may be executed on the basis of operation other than sound.

In the function execution processing, first, the function executing unit 169 receives predetermined operation for executing a function with sound (step S11). The predetermined operation may be manual operation on the operation unit 135 or may be identification of some word serving as sound identified by the sound processing unit 170. If the predetermined operation is not received in the processing in step S11 (NO in step S11), the function executing unit 169 continues to stand by for reception of the predetermined operation (step S11). When the predetermined operation is received (YES in step S11), the function executing unit 169 causes, with the image setting unit 165, the image display unit 20 to display a trigger image (step S13). The trigger image is an image having a display region smaller than a display region of a character image of "Menu" created on the basis of the image associated with the function of "Menu" stored in the first layer of the image storing unit 122. The trigger image may be apart of the original image of "Menu" or may be a trigger image stored in association with the image of "Menu" in the image storing unit 122.

Figure 6:
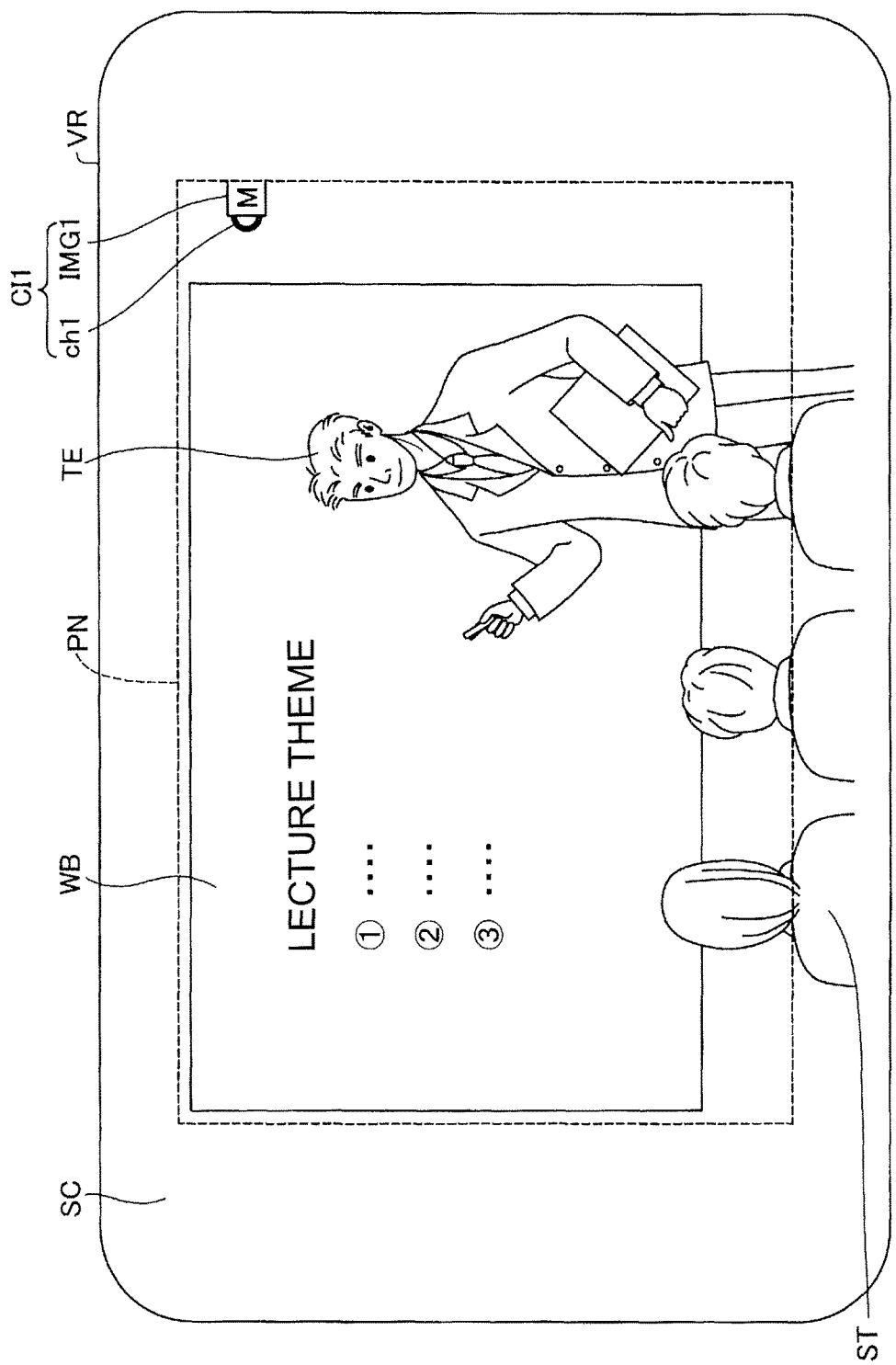
FIG. 6 is an explanatory diagram showing a visual field VR visually recognized by a user when a trigger image is displayed on an image display unit.

FIG. 6 is an explanatory diagram showing a visual field VR visually recognized by the user when the trigger image is displayed on the image display unit 20. As shown in FIG. 6, the user visually recognizes an outside scene SC transmitted through the optical-image display units 26 and 28 and a combined image CI1 serving as the trigger image displayed in an image display largest region PN, which is a largest region in which the image display unit 20 can display an image. The outside scene SC includes a teacher TE who is delivering a lecture in school, a plurality of students ST who are listening to the lecture, and characters written on a whiteboard WB by the teacher TE. A combined image CI1 displayed in the image display largest region PN includes an image IMG1 and a tie image ch1. The image IMG1 is a part of a character image associated with the function of "Menu" (FIG. 3) stored in the first layer FR1 in the image storing unit 122. Only an initial "M" is displayed in the image display largest region PN. The tie image ch1 is an image created with the red color and combined with the image of "Menu". Note that, in FIG. 6 and subsequent figures, the image display largest region PN is indicated by a broken line. However, the image display largest region PN is shown for convenience of explanation and is not visually recognized by the user.

When the trigger image is displayed in the image display largest region PN of the image display unit 20 (step S13 in FIG. 5), the sound processing unit 170 acquires sound set as operation for selecting the trigger image (step S15). In this embodiment, as the sound for selecting the trigger image, "menu", "emu", which is an initial of "Menu", and "aka (red)", which is a color associated with "Menu", are set. If the set sound is not acquired (NO in step S15), the sound processing unit 170 continues to stand by for acquisition of the set sound (step S15). If the set sound is acquired (YES in step S15), the image setting unit 165 causes the image display unit 20 to display, in the image display largest region PN, a combined image CI2 including an execution function image of the function "Menu" stored in the first layer FR1 of the image storing unit 122 (step S17).

Figure 7:
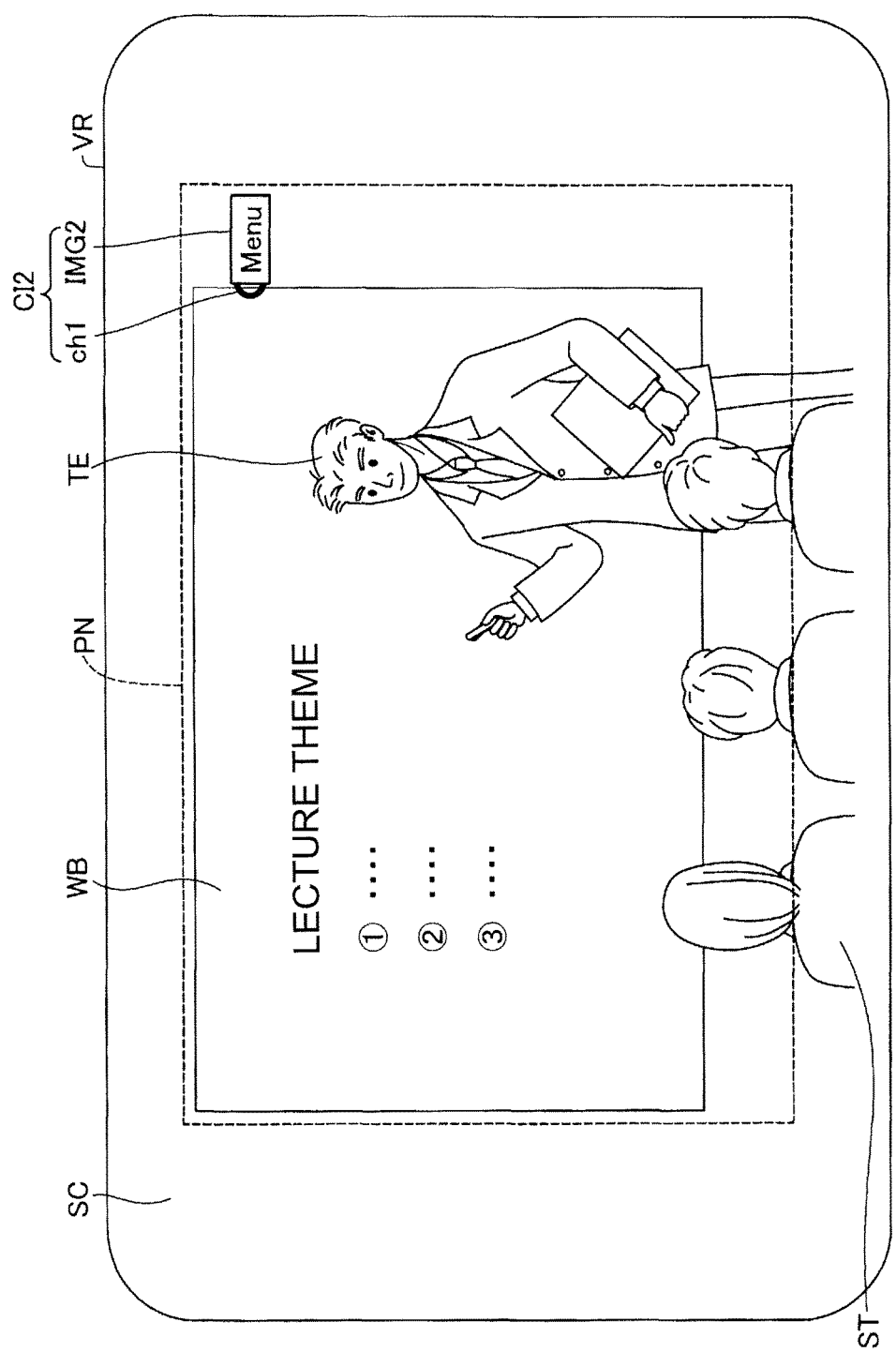
FIG. 7 is an explanatory diagram showing a visual field visually recognized by the user when a combined image associated with the trigger image is displayed.

FIG. 7 is an explanatory diagram showing the visual field VR visually recognized by the user when the combined image CI2 associated with the trigger image is displayed. As shown in FIG. 7, the combined image CI2 including an image IMG2 representing a function executed when "Menu" stored in the first layer FR1 of the image storing unit 122 is selected is displayed in the image display largest region PN. Like the combined image CI1, the combined image CI2 includes the tie image ch1 displayed in red and the image IMG2. Note that the image setting unit 165 causes the image display unit 20 to display images such as the combined images CI1 and CI2 in a region excluding the center of the image display largest region PN. In this embodiment, the center of the image display largest region PN means a portion of one region in the middle of nine divided regions in total formed by dividing the image display largest region PN into three both longitudinally and laterally. Note that the definition of the center in the image display largest region PN can be variously changed and may be different from the definition in this embodiment. The tie image ch1 corresponds to the specific sound image in the appended claims.

When the image IMG2 representing the function of "Menu" stored in the first layer FR1 is displayed in the image display largest region PN (step S17 in FIG. 5), the sound processing unit 170 stands by for acquisition of sound for selecting the combined image CI2 including the image IMG2 (step S19). Sound to be acquired is sound same as the sound in selecting the combined image CI1 in the processing in step S13. If the sound for selecting the combined image CI2 is not acquired (NO in step S19), the image setting unit 165 determines whether a fixed time set in advance has elapsed after the image setting unit 165 causes the image display unit 20 to display the combined image CI2 in the image display largest region PN (step S21). If it is determined that the fixed time set in advance has not elapsed yet (NO in step S21), the sound processing unit 170 continues to stand by for acquisition of the sound for selecting the combined image CI2 (step S19). If it is determined in the processing in step S21 that the fixed time has elapsed after the image setting unit 165 causes the image display unit 20 to display the combined image CI2 in the image display largest region PN (YES in step S21), the image setting unit 165 changes the combined image CI2 to the combined image CI1, which is the trigger image, and causes the image display unit 20 to display the combined image CI1 in the image display largest region PN (step S13).

If the sound for selecting the combined image CI2 including the image IMG2 is acquired in the processing in step S19 (YES in step S19), the function executing unit 169 determines whether the image IMG2 is an execution function image associated with a function of the bottom layer stored in the image storing unit 122 (step S23). When the execution function image of the function stored in the bottom layer is selected, the function executing unit 169 causes the HMD 100 to execute some selected function executable by the HMD 100 such as sound recording rather than causing the image setting unit 165 to change display images among the layers stored in the image storing unit 122. Examples of the execution function image associated with the function stored in the bottom layer include "Start" for starting sound recording serving as the function and "End" for ending the sound recording stored in the fourth layer FR4 of the image storing unit 122.

In the processing in step S23, the selected combined image CI2 is an image including the image IMG2, which is not the execution function image associated with the function of the bottom layer (NO in step S23). Therefore, the image setting unit 165 causes the image display unit 20 to display, in the image display largest region PN, an image associated with a function selectable after the function associated with the image IMG2 included in the selected combined image CI2 is executed (step S25).

Figure 8:
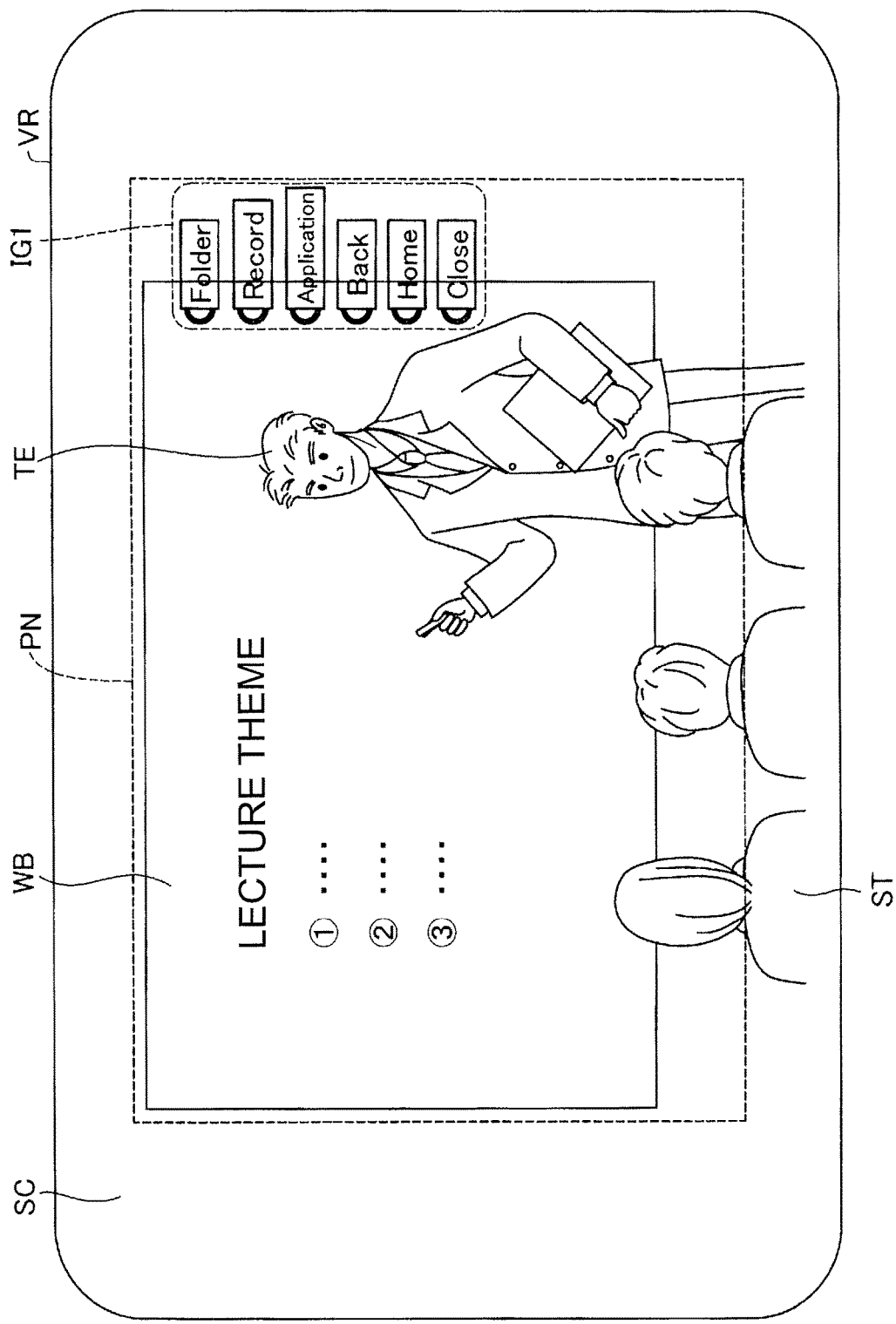
FIG. 8 is an explanatory diagram showing a visual field visually recognized by the user when a selection group image including images respectively associated with a plurality of functions stored in a second layer is displayed.

FIG. 8 is an explanatory diagram showing the visual field VR visually recognized by the user when a selection group image IG1 including images respectively associated with a plurality of functions stored in the second layer FR2 is displayed. The selection group image is an image including two or more execution function images, that is, formed by a selectable plurality of images. When the combined image CI2 including the image IMG2 is selected, as shown in FIG. 8, the selection group image IG1 including the images respectively associated with the plurality of functions stored in the second layer FR2 associated with the image IMG2 and images indicating colors associated with the images is displayed in the image display largest region PN. As shown in FIG. 8, the selection group image IG1 is formed by a plurality of combined images including a selectable plurality of execution function images associated with functions stored in the second layer FR2, which is the same layer, such as "Folder" or "Record", and tie images respectively combined with the plurality of execution function images. The tie images respectively combined with the plurality of execution function images are displayed in the image display largest region PN as different colors. Therefore, when the sound processing unit 170 identifies, as sound, a color associated with a tie image combined with an execution function image included in the selection group image IG1, the function executing unit 169 executes a function based on the execution function image combined with the identified color. Note that broken lines indicating the selection group images IG1 and IG3 are shown for convenience of explanation and are not visually recognized by the user.

When the selection group image IG1 is displayed in the image display largest region PN (step S25 in FIG. 5), the function executing unit 169 repeats the processing in step S19 and subsequent steps until the execution function image associated with the function of the bottom layer stored in the image storing unit 122 is selected. In this embodiment, "Record", which is an execution function image for executing a function of sound recording, in the selection group image IG1 including execution function images associated with the plurality of functions stored in the second layer FR2 is selected. On the basis of the selection of "Record", a selection group image IG2 including execution function images associated with a plurality of functions stored in the third layer FR3 immediately below the selection group image IG1 including the combined image of "Record" is displayed in the image display maximum region PN. Thereafter, "New" (FIG. 3) is selected as an execution function image included in the displayed selection group image IG2. On the basis of selected "New", the selection group image IG3 including execution function images associated with a plurality of functions stored in a fourth layer FR4 immediately below the selection group image IG2 including the execution function images associated with the function of New is displayed in the image display maximum region PN.

Figure 9:
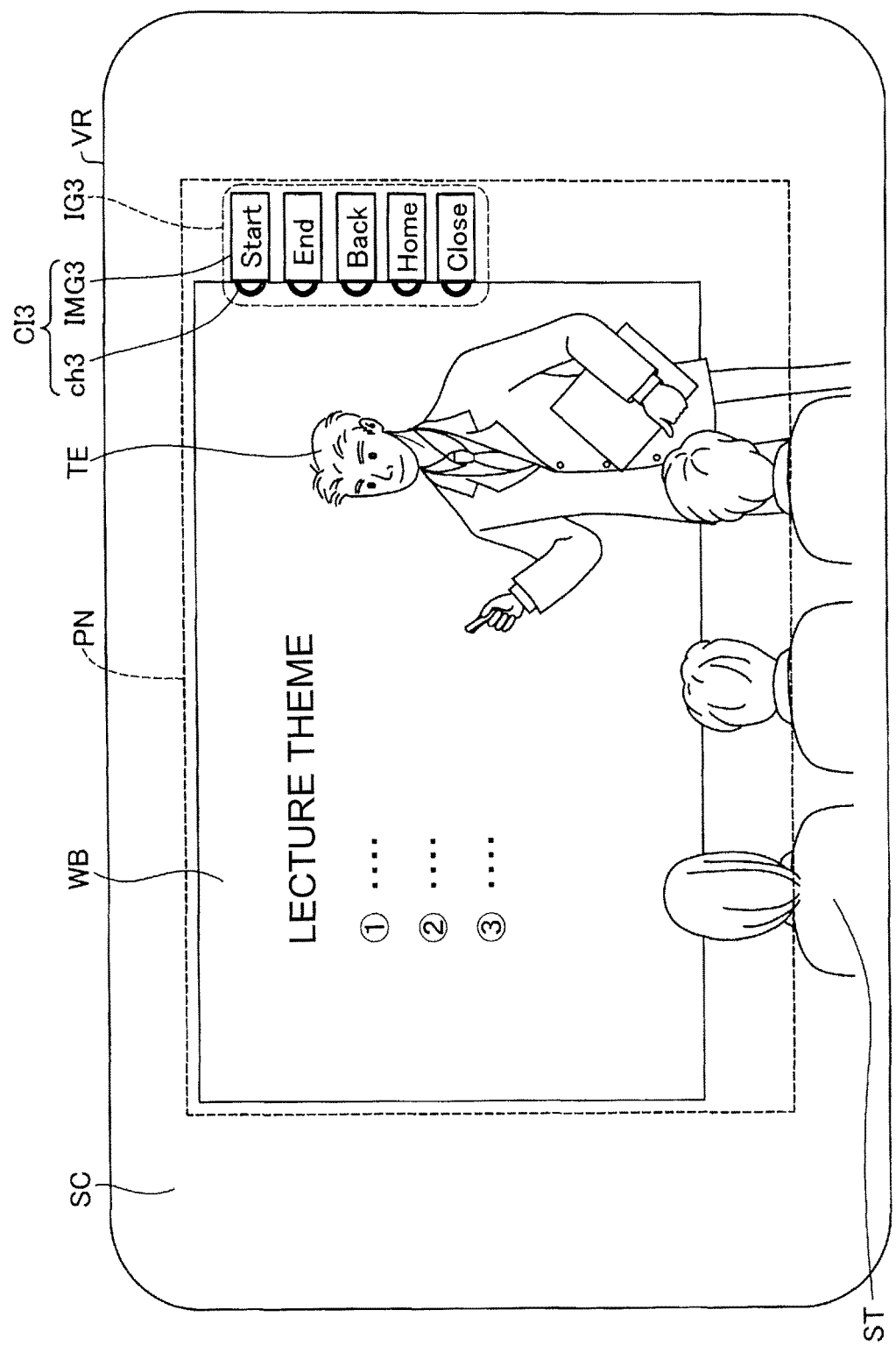
FIG. 9 is an explanatory diagram showing a visual field visually recognized by the user when a selection group image including execution function images associated with functions stored in a fourth layer is displayed.

FIG. 9 is an explanatory diagram showing the visual field VR visually recognized by the user when the selection group image IG3 including the execution function images associated with the functions stored in the fourth layer FR4 is displayed. The selection group image IG3 includes a combined image CI3 including an image IMG3 of "Start", which is an execution function image associated with the function of the bottom layer stored in the image storing unit 122. If the combined image CI3 is selected out of the selection group image IG3 in the processing in step S19 in FIG. 5 (YES in step S19), since the image IMG3 of "Start" included in the combined image CI3 is an execution function image (YES in step S23), the CPU 140 executes sound recording of sound on the outside as a function associated with the image IMG3 of "Start", which is the selected execution function image, (step S27) and ends the function execution processing.

As explained above, in the HMD 100 in this embodiment, the image setting unit 165 causes the image display unit 20 to display, in the image display largest region PN, the combined image CI1 including the image IMG1 serving as the execution function image and the tie image ch1 combined with the execution function image. When the microphone 63 and the sound processing unit 170 acquire sound associated with the tie image ch1, the function executing unit 169 causes the HMD 100 to execute the function associated with the image IMG1 combined with the tie image ch1. That is, the function executed by the HMD 100 is executed by acquiring sound associated with the tie image ch1 combined with the image IMG1 displayed on the image display unit 20. Therefore, in the HMD 100 in this embodiment, a function executed by the HMD 100 is determined according to sounds corresponding to the tie images ch1 smaller in number than types of functions to be executed. Therefore, accuracy of sound identification is improved. Since the number of tie images ch1 is limited, it is possible to execute a function by sound of a short word. Convenience of use of the HMD 100 is improved.

In the HMD 100 in this embodiment, the selection group image IG1 or the like including a plurality of combined images is displayed in the image display largest region PN. Therefore, an execution function image capable of executing a plurality of functions on one display screen is displayed in the image display maximum region PN. Convenience of use for the user is improved.

In the HMD 100 in this embodiment, as functions associated with the execution function images, functions of lower layers stored in the image storing unit 122 are displayed as a list of a plurality of execution function images in the image display largest region PN by character images. Therefore, the convenience of use for the user is further improved.

In the HMD 100 in this embodiment, as shown in FIG. 7, in the combined image CI1 as well, the size of a region where the tie image ch1 is displayed in the image display largest region PN is smaller than the size of a region where the image IMG2, which is the execution function image, is displayed in the image display largest region PN. Therefore, a useless image unrelated to execution of a function is not unnecessarily displayed in the image display largest region PN. The user can easily recognize content of a function to be executed when selected. Convenience for the user is improved.

In the HMD 100 in this embodiment, the tie image ch1 associated with the image IMG1 or the like is an image related to a color. Therefore, it is possible to further improve the accuracy of sound identification.

In the HMD 100 in this embodiment, the image setting unit 165 causes the image display unit 20 to display the combined image CI1 in a portion excluding the center in the image display largest region PN. Therefore, the visual field of the user is not unnecessarily narrowed. The convenience for the user is improved.

B. Second Embodiment

Figure 10:
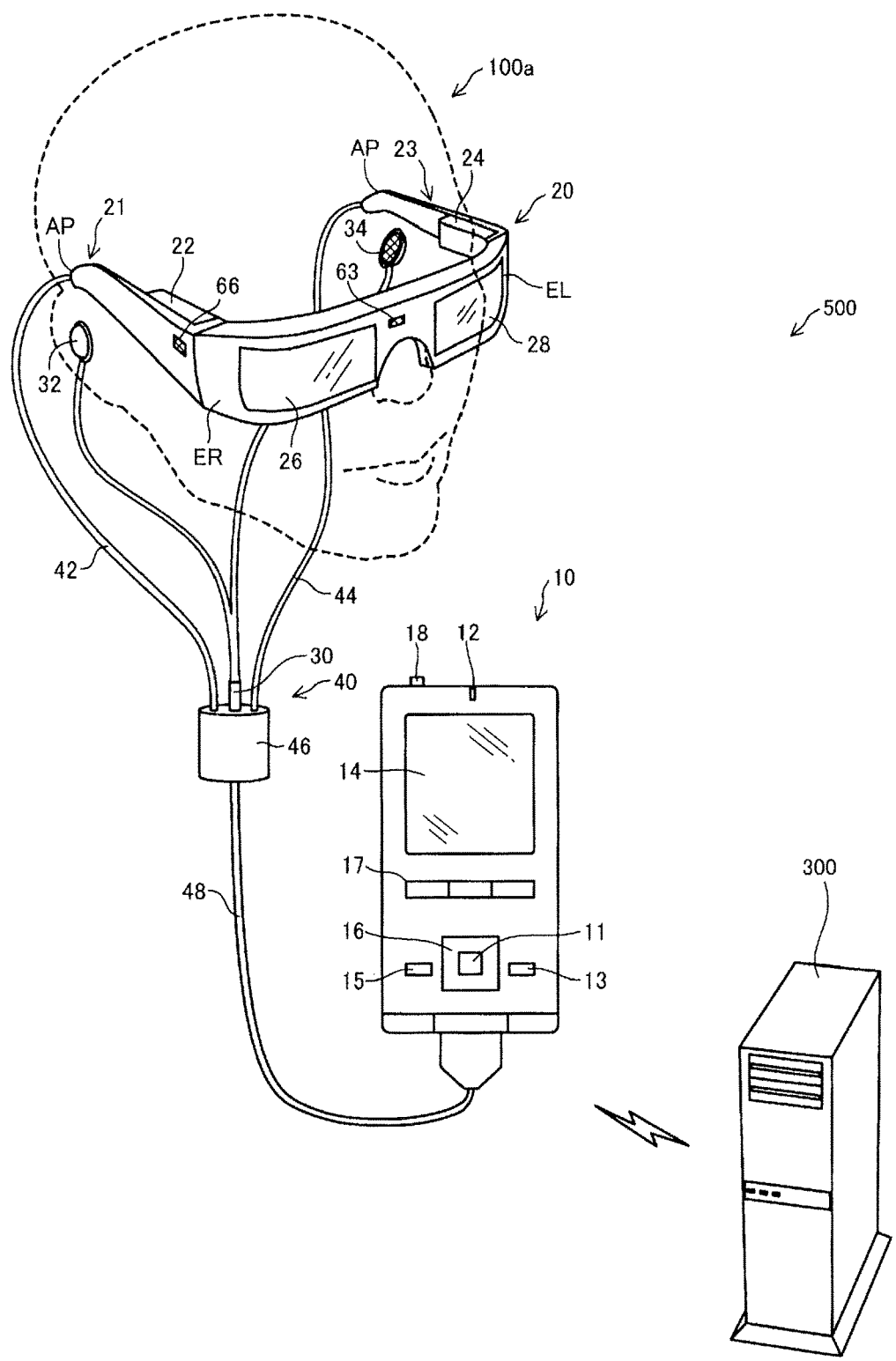
FIG. 10 is an explanatory diagram showing the configuration of an information system including an HMD in a second embodiment.

FIG. 10 is an explanatory diagram showing the configuration of an information system 500 including an HMD 100a in a second embodiment. As shown in FIG. 10, the information system 500 includes the HMD 100a and a server 300 including a storing unit that stores function execution images associated with functions executable by other devices.

Figure 11:
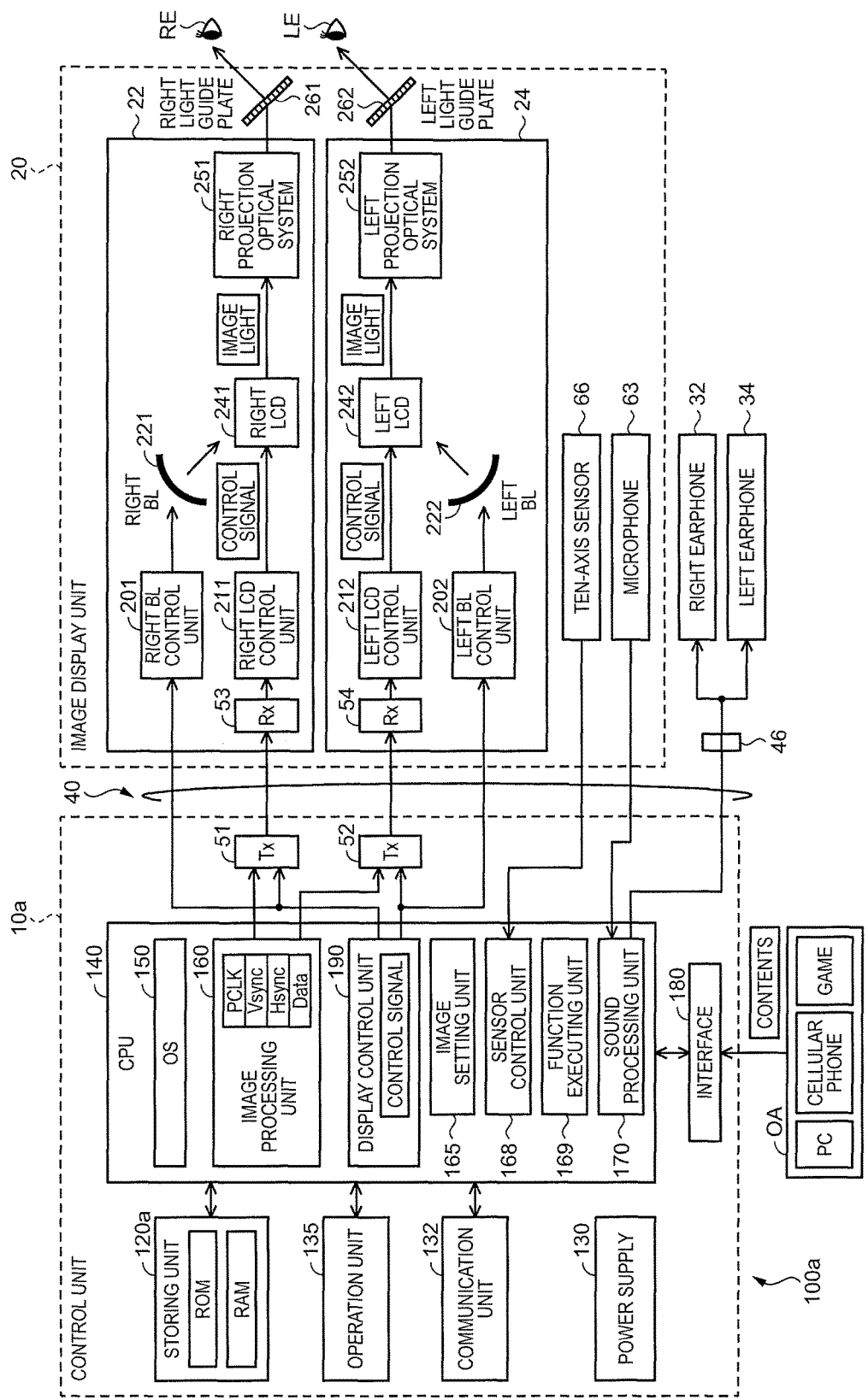
FIG. 11 is a block diagram showing the configuration of the HMD in the second embodiment in terms of functions.

FIG. 11 is a block diagram showing the configuration of the HMD 100a in the second embodiment in terms of functions. As shown in FIG. 11, the HMD 100a in the second embodiment is different from the HMD 100 in the first embodiment in that a control unit 10a includes a wireless communication unit 132 and a storing unit 120a of the control unit 10a does not include the image storing unit 122. Otherwise, the HMD 100a is the same as the HMD 100 in the first embodiment. The wireless communication unit 132 performs wireless communication with other devices according to a predetermined wireless communication system such as a wireless LAN or a Bluetooth (registered trademark). When receiving predetermined operation for performing the function execution processing in the first embodiment, the control unit 10a acquires, via the wireless communication unit 132, execution function images associated with functions executable by other devices stored in the server 300. Thereafter, the image setting unit 165 causes the image display unit 20 to display, in the image display largest region PN, combined images obtained by combining the respective acquired execution function images with images (e.g., tie images) associated with specific sounds (e.g., "red") or the like. The function executing unit 169 causes, on the basis of an image displayed in the image display largest region PN and operation received from the user, another device connected to the HMD 100 to execute a function associated with a selected execution function image via the wireless communication unit 132. Note that the wireless communication unit 132 corresponds to the communication unit in the appended claims. In the second embodiment, the information system 500 includes only one HMD 100a and one server 300. However, in other embodiments, an information system may include a plurality of HMDs 100a and a plurality of servers 300.

In the HMD 100a in the second embodiment, the function executing unit 169 causes a device other than the HMD 100a to execute a function of the other device via the wireless communication unit 132. Therefore, the user can also execute a function other than the HMD 100a present in a remote position. The convenience for the user is improved.

C. Modifications

Note that the invention is not limited to the embodiments. The invention can be carried out in various forms without departing from the spirit of the invention. For example, modifications explained below are also possible.

C-1. Modification 1

In the first embodiment, the examples of the combined images and the selection group images displayed in the image display largest region PN of the image display unit 20 are explained. However, the combined images and the selection group images displayed in the image display largest region PN are not limited to the forms in the embodiment and can be variously modified. In this modification, the image setting unit 165 causes the image display unit 20 to display a selection group image in the image display largest region PN according to the direction of the head of the user detected by the ten-axis sensor 66 and the sensor control unit 168. One execution function image is selected out of displayed execution function images. In a state in which the selection group image is displayed in the image display largest region PN, when receiving operation for selecting one execution function image by sound, the function executing unit 169 executes a function of the HMD 100 associated with the selected execution function image.

Figure 12:
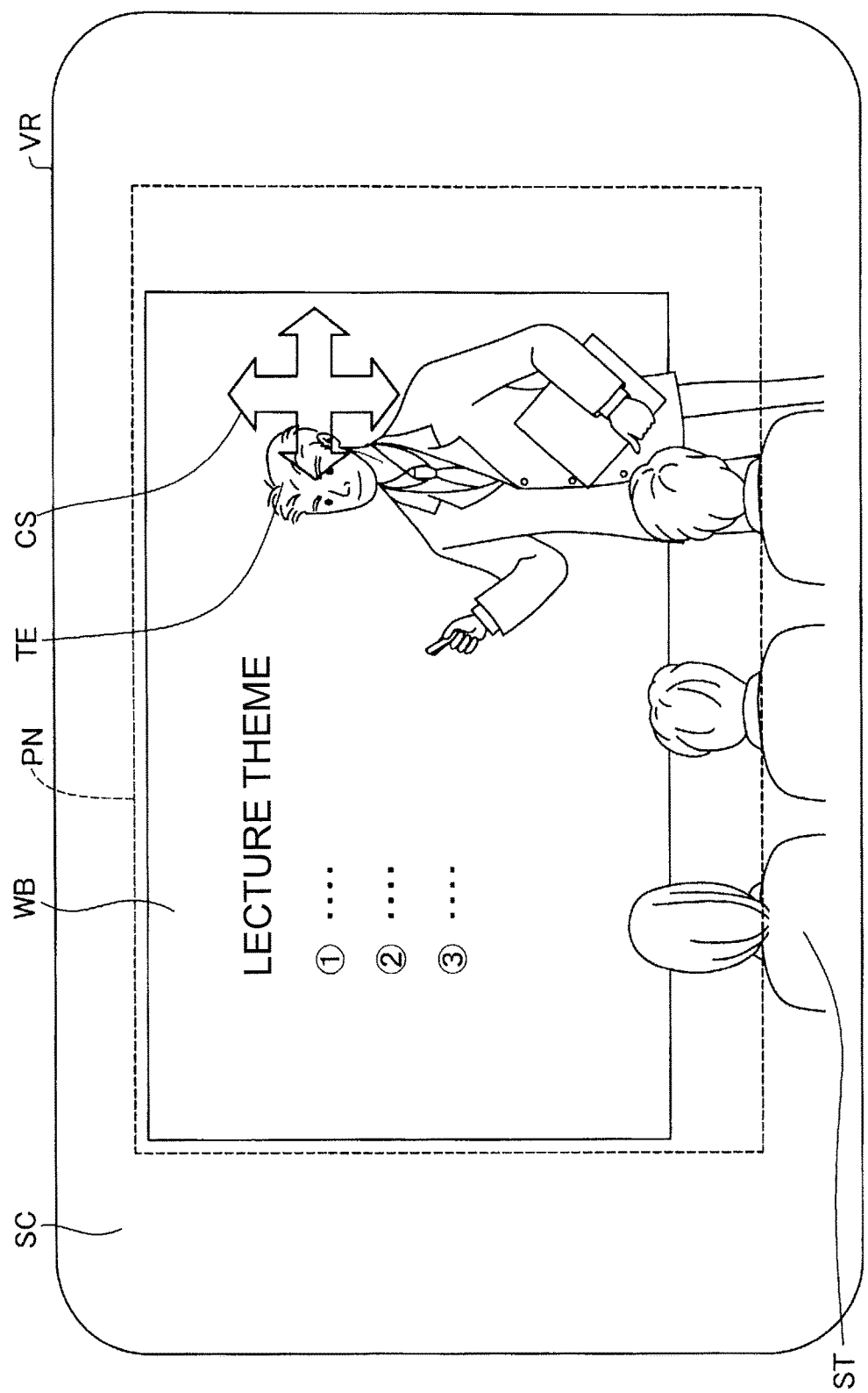
FIG. 12 is an explanatory diagram showing a visual field visually recognized by the user when a cross image for displaying an execution function image in a modification is displayed.

FIG. 12 is an explanatory diagram showing the visual field VR visually recognized by the user when a cross image CS for displaying an execution function image in the modification is displayed. In FIG. 12, the cross image CS displayed in the image display largest region PN before the selection group image IG3 shown in FIG. 9 in the first embodiment is displayed in the image display largest region PN is shown. As shown in FIG. 12, the cross image CS is an image formed by four arrows directed in upward, downward, left, and right directions. When a change in the direction of the head of the user detected by the ten-axis sensor 66 is equal to or larger than a predetermined value, the sensor control unit 168 detects that the direction of the head of the user changes to any one of the upward, downward, left, and right directions.

Figure 13:
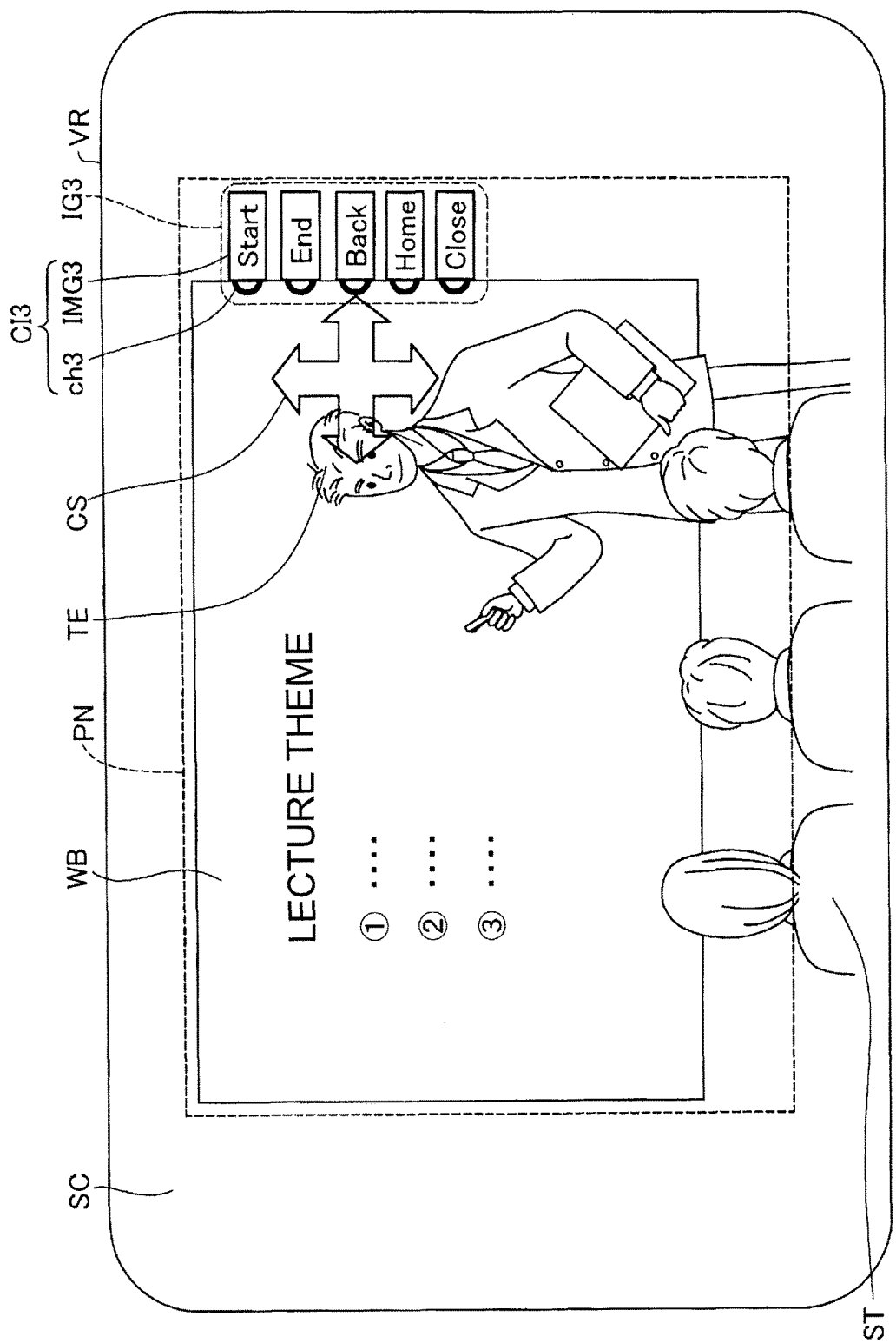
FIG. 13 is an explanatory diagram showing a visual field visually recognized by the user when a right direction in the cross image in the modification is selected.

FIG. 13 is an explanatory diagram showing the visual field VR visually recognized by the user when the right direction in the cross image CS in the modification is selected. When the sensor control unit 168 determines that the direction of the head of the user changes to the right (the user shakes the head to the right), the image setting unit 165 causes the image display unit 20 to display the selection group image IG3 associated with the right of the cross image CS in the image display largest region PN in addition to the cross image CS. In this case, when sound for selecting any one of combined images included in the selection group image IG3 is acquired, the function executing unit 169 causes the HMD 100 to execute a function corresponding to an execution function image of the acquired sound. In this modification, the function executing unit 169 causes the HMD 100 to execute a predetermined function on the basis of the direction of the head of the user detected by the ten-axis sensor 66 and the sensor control unit 168 and sound acquired by the microphone 63 and the sound processing unit 170. Therefore, in the HMD 100 in this modification, in determination of a function to be executed, not only sound but also a motion of the head of the user is added. Therefore, the user can sensibly easily operate the HMD 100. The convenience for the user is improved.

In the embodiments and the modification, the various functions are executed on the basis of the detected direction of the head of the user and the identified sound. However, a motion of the user to be detected is not limited to the direction of the head and can be variously modified. For example, the motion of the user may be detected by a gyro sensor or the like worn on an arm or a foot. The function executing unit 169 may cause the HMD 100 to execute the various functions in association with a gyro sensor or the like incorporated in a clock worn by the user, a pen held by the user in writing, or the like.

C-2. Modification 2

In the embodiments, as the tie images ch1 associated with the image IMG1 and the like, the colors such as "red" and "blue" are adopted. However, the tie images ch1 can be variously modified. For example, instead of the tie images ch1, images of animals such as "lion" and "bird" may be added to the image IMG1 and the like and displayed in the image display largest region PN. From the viewpoint of prevention of misrecognition, as the images to be added, it is desirable to select words not used in daily conversation. For example, in a factory that performs assembling and the like of machines, words and the like related to animals unrelated to the machines are desirable.

From the viewpoint of selecting one execution function image from a plurality of execution function images, images respectively associated with the plurality of execution function images are desirably images selected out of the same category such as animals or colors. In this case, it is possible to prevent the user from selecting an unintended execution function image by mistake from the plurality of execution function images displayed in the image display largest region PN in parallel.

In the first embodiment, in the image display largest region PN, before the combined image CI2 is displayed, the combined image CI1 serving as the trigger image is displayed. However, the trigger image does not always have to be displayed. When the selection group image IG1 or the like in a layer (e.g., the second layer FR2) or the like other than the first layer FR1 is displayed in the image display largest region PN, when a predetermined time elapses, a trigger image corresponding to a part of the selection group image IG1 may be displayed in the image display largest region PN. The trigger image may be only the tie image ch1. The image IMG1 and the like, which are the execution function images, do not have to be displayed in the image display largest region PN.

Figure 14:
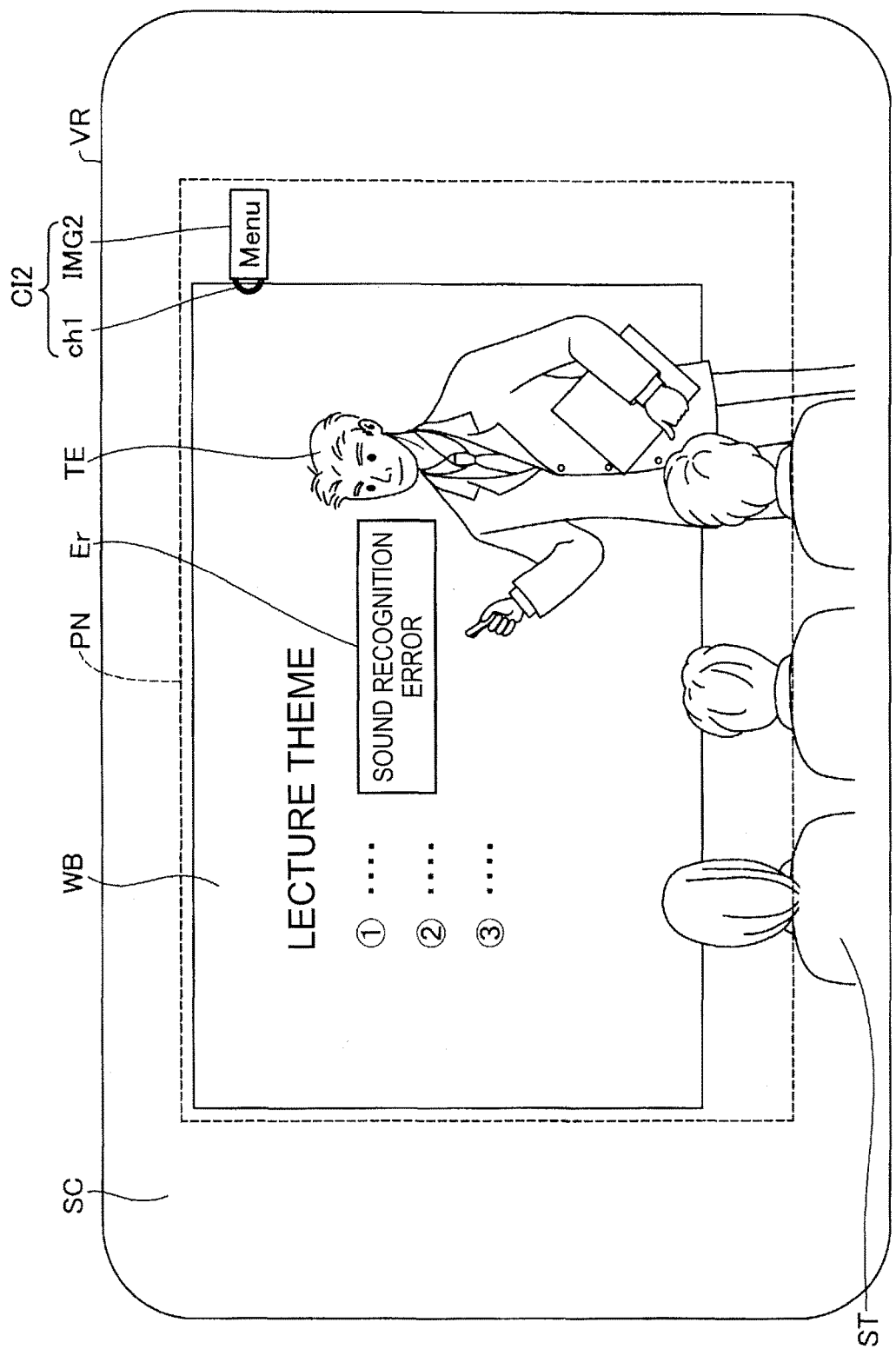
FIG. 14 is an explanatory diagram showing a visual field visually recognized by the user when an error image is displayed in an image display largest region.

When sound is not correctly identified, the image setting unit 165 may cause the image display unit 20 to display an error image for causing the user to visually recognize to that effect in the image display largest region PN. FIG. 14 is an explanatory diagram showing the visual field VR visually recognized by the user when an error image Er is displayed in the image display largest region PN. In FIG. 14, a state is shown in which sound identification is not correctly performed by the sound processing unit 170 and the error image Er, which is a character image indicating a sound identification error, is displayed in the image display largest region PN in FIG. 9 in the embodiment. For example, when sound is identified as the sound of "aka", the sound processing unit 170 identifies a color as the color of "red". However, when only one of two characters is different as in "ara" and "saka", the difference is detected as the sound identification error. When the error is detected, the image setting unit 165 causes the image display unit 20 to display the error image Er in the image display largest region PN. When less than a half of words that should be identified are different, the sound processing unit 170 desirably detects the difference as the sound identification error. However, the difference is not limited to this number. For example, when 80% of the words are different, the difference may be detected as the sound identification error.

C-3. Modification 3

In the embodiments, a plurality of combined images such as the combined image CI2 are displayed in the image display largest region PN as one selection group image IG1. However, the plurality of combined images do not always have to be collectively displayed in the image display largest region PN like the selection group image IG2. For example, execution function images displayed in the image display largest region PN may be changed one after another at every one second.

In the embodiments, the image storing unit 122 has the hierarchical structure. However, the image storing unit 122 does not always need to have the hierarchical structure. For example, the image storing unit 122 may store, in one layer, a plurality of execution function images associated with functions executable by the HMD 100. Only functions and execution function images selected by the user may be stored in the image storing unit 122.

In the embodiments, the HMD 100 includes the ten-axis sensor 66, the sensor control unit 168, and the wireless communication unit 132 as the components. However, the HMD 100 does not always need to include the ten-axis sensor 66, the sensor control unit 168, and the wireless communication unit 132. A motion of the user does not always have to be detected by the ten-axis sensor 66 and the sensor control unit 168. Transmission and reception of information to and from another device does not always have to be performed by the wireless communication unit 132.

In the embodiment, the combined image CI2 and the like are displayed in the region excluding the center of the image display largest region PN. However, the region where the combined image CI2 is displayed can be variously modified. For example, the combined image CI2 may be displayed in the center of the image display largest region PN to be conspicuous. A position where the combined image CI2 is displayed in the image display largest region PN may be different according to the detected direction of the head of the user. Only an image with high importance may be displayed in the center of the image display largest region PN according to content of the combined image CI1.

The image setting unit 165 may set, according to a target shown in a picked-up image, the size and the position of an image to be displayed in the image display largest region PN. For example, the distance to the target included in the picked-up image may be specified. The image setting unit 165 may change, according to the magnitude of the distance, the size of a font of a character image displayed in the image display largest region PN. As a method of measuring the distance to the target in the picked-up image, the distance to the target with respect to two cameras may be measured by a stereo camera on the basis of the positions of the two cameras and the positions of the target in picked-up images picked up by the two cameras. The distance from the image display unit 20 to the target may be measured by a TOF sensor, an infrared sensor, or the like. When an image of a target such as an automobile is stored in advance, the distance to the target and a positional relation with the target may be measured by comparing the sizes and the directions of the image stored in advance and a picked-up image.

The image setting unit 165 may cause the image display unit 20 to display an image based on a picked-up image of the target in the image display largest region PN. For example, when the user of the HMD 100 is attending a specific lecture of physics or the like, if technical terms, special figures, and the like used in the lecture are registered in advance and a registered technical term or the like is detected from a picked-up image, the image setting unit 165 may cause, according to the position of the detected technical term or the like, the image display unit 20 to display, in the image display largest region PN, an icon that can display explanation of the technical term. For example, the image setting unit 165 may cause the image display unit 20 to display an icon including a character image "detailed explanation" in red or the like near the detected technical term and, when sound of "red" is acquired, display an explanation sentence stored in advance in association with the detected technical term in the image display largest region PN. The image setting unit 165 may appropriately change the size of the image of the icon of "detailed explanation" according to the size of an image of the technical term detected out of the picked-up image and cause the image display unit 20 to display the image of the icon of "detailed explanation" in the image display largest region PN. As explained above, according to the relation such as the distance and the position with the image of the target detected out of the picked-up image, the image setting unit 165 may appropriately set the type, the size, and the position of the image displayed in the image display largest region PN.

C-4. Modification 4

In the embodiments, the operation unit 135 is formed in the control unit 10. However, the form of the operation unit 135 can be variously modified. For example, a user interface separate from the control unit 10 and functioning as the operation unit 135 may be provided. In this case, since the operation unit 135 is separate from the control unit 10 in which the power supply 130 and the like are formed, the operation unit 135 can be reduced in size. Operability of the user is improved. All of the CPU 140 and the power supply 130 configuring the control unit 10 may be mounted on the image display unit 20 in the HMD 100. In the HMD 100, a controller configured separately from the image display unit 20 is not provided. Therefore, the HMD 100 can be further reduced in size. Since the CPUs 140 are respectively mounted on the control unit 10 and the image display unit 20, the control unit 10 may be used as a controller alone and the image display unit 20 may be used as a display device alone.

For example, the image-light generating unit may include an organic EL (Organic Electro-Luminescence) display and an organic EL control unit. For example, as the image-light generating unit, an LCOS (Liquid crystal on silicon; LCOS is a registered trademark), a digital micro mirror device, and the like can also be used instead of the LCD. For example, the invention can also be applied to the HMD 100 of a laser retinal projection type.

For example, the HMD 100 may be a head mounted display of a form in which the optical-image display units cover only a portion of the eyes of the user, in other words, a form in which the optical-image display units do not completely cover the eyes of the user. The HMD 100 may be a head mounted display of a so-called monocular type. In the embodiments, the HMD 100 is a binocular optical transmission type. However, the invention can also be applied to head-mounted display devices of other types such as a video transmission type.

The HMD 100 may be used as a display device for only displaying an image based on an image signal received from another device. Specifically, the HMD 100 may be used as a display device equivalent to a monitor of a desktop PC. For example, by receiving an image signal from the desktop PC, the HMD 100 may display an image in the image display largest region PN of the image display unit 20.

The HMD 100 may be used to function as a part of the system. For example, the HMD 100 may be used as a device for executing a part of functions of a system including an airplane. The system in which the HMD 100 is used is not limited to the system including the airplane and may be systems including an automobile, a bicycle, and the like.

As the earphones, an ear hook type and a headband type may be used. The earphones may be omitted. For example, the HMD 100 may be configured as a head-mounted display device mounted on vehicles such as an automobile and an airplane. The HMD 100 may be configured as a head-mounted display device incorporated in a body protector such as a helmet.

C-5. Modification 5

The configuration of the HMD 100 in the embodiments is only an example and can be variously modified. For example, the direction key 16 provided in the control unit 10 may be omitted. Other operation interfaces such as an operation stick may be provided in addition to the direction key 16 and the track pad 14. Input devices such as a keyboard and a mouse may be connectable to the control unit 10. The control unit 10 may receive inputs from the keyboard and the mouse.

As the image display unit, for example, an image display unit of another type such as an image display unit worn like a hat may be adopted instead of the image display unit 20 worn like eyeglasses. The earphones 32 and 34 can be omitted as appropriate.

Figure 15A:
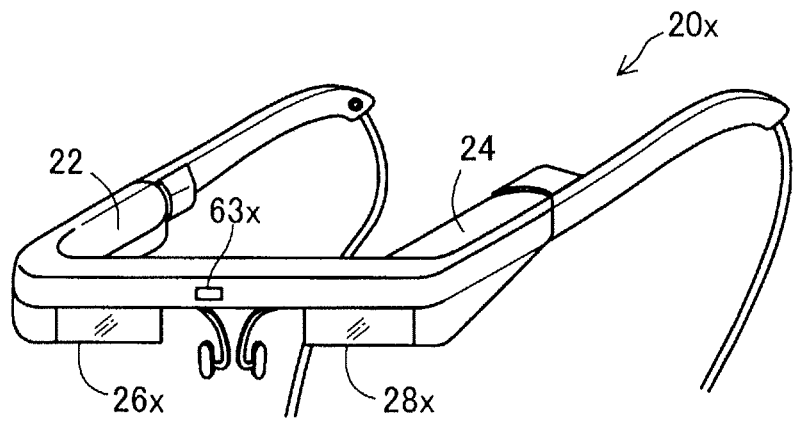
FIGS. 15A and 15B are explanatory diagrams showing the exterior configuration of an HMD in the modification.
Figure 15B:
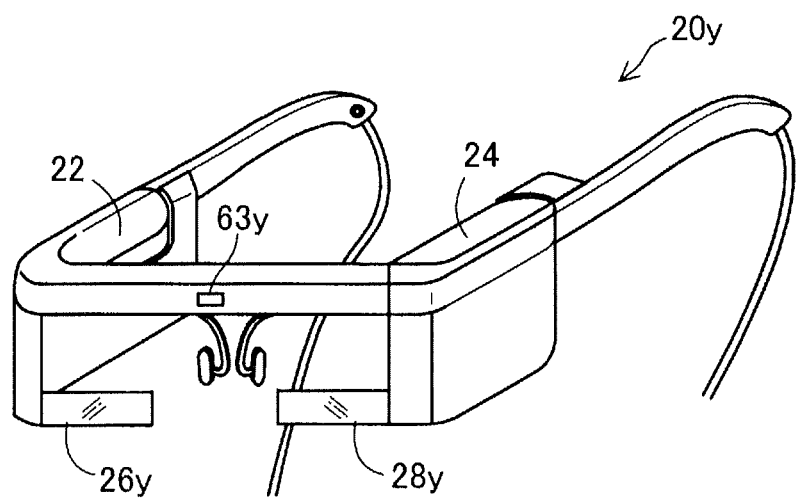

FIGS. 15A and 15B are explanatory diagrams showing the exterior configurations of HMDs in a modification. In an example shown in FIG. 15A, an HMD 100x is different from the HMD 100 shown in FIG. 1 in that an image display unit 20x includes a right optical-image display unit 26x instead of the right optical-image display unit 26 and includes a left optical-image display unit 28x instead of the left optical-image display unit 28. The right optical-image display unit 26x is formed smaller than the optical member in the embodiments and is disposed obliquely above the right eye of the user when the user wears the HMD 100x. Similarly, the left optical-image display unit 28x is formed smaller than the optical member in the embodiments and is disposed obliquely above the left eye of the user when the user wears the HMD 100x. In an example shown in FIG. 15B, an HMD 100y is different from the HMD 100 shown in FIG. 1 in that an image display unit 20y includes a right optical-image display unit 26y instead of the right optical-image display unit 26 and includes a left optical-image display unit 28y instead of the left optical-image display unit 28. The right optical-image display unit 26y is formed smaller than the optical member in the embodiments and is disposed obliquely below the right eye of the user when the user wears the HMD 100y. Similarly, the left optical-image display unit 28y is formed smaller than the optical member in the embodiments and is disposed obliquely below the left eye of the user when the user wears the HMD 100y. In this way, the optical-image display units only have to be disposed in the vicinities of the eyes of the user. The size of the optical members forming the optical-image display units is also optional. The head-mounted display device can also be implemented as the HMD 100 of a form in which the optical-image display units cover only a portion of the eyes of the user, in other words, a form in which the optical-image display unit do not completely cover the eyes of the user.

In the embodiments, the HMD 100 may guide image lights representing the same image to the left and right eyes of the user and cause the user to visually recognize a two-dimensional image or may guide image lights representing different images to the left and right eyes of the user and cause the user to visually recognize a three-dimensional image.

In the embodiments, a part of the components implemented by hardware may be replaced with software. Conversely, a part of the components implemented by software may be replaced with hardware. For example, in the embodiments, the image processing unit 160 and the sound processing unit 170 are implemented by the CPU 140 reading out and executing a computer program. However, these functional units may be implemented by a hardware circuit.

When a part or all of the functions of the invention are implemented by software, the software (a computer program) can be provided in a form in which the software is stored in a computer-readable recording medium. In the invention, the "computer-readable recording medium" is not limited to portable recording media such as a flexible disk and a CD-ROM and also includes internal storage devices in a computer such as various RAMS and ROMs and external storage devices fixed to a computer such as a hard disk.

In the embodiments, as shown in FIGS. 1 and 4, the control unit 10 and the image display unit 20 are formed as the separate components. However, the configurations of the control unit 10 and the image display unit 20 are not limited to this and can be variously modified. For example, on the inside of the image display unit 20, all of the components formed in the control unit 10 may be formed or a part of the components may be formed. The power supply 130 in the embodiments may be independently formed and replaceable. The components formed in the control unit 10 may be redundantly formed in the image display unit 20. For example, the CPU 140 shown in FIG. 2 may be formed in both of the control unit 10 and the image display unit 20. The functions performed by the CPU 140 formed in the control unit 10 and the CPU formed in the image display unit 20 may be separated.

The invention is not limited to the embodiments and the modifications and can be implemented in various configurations without departing from the spirit of the invention. For example, the technical features in the embodiments and the modifications corresponding to the technical features of the aspects described in the Summary can be replaced and combined as appropriate in order to solve a part or all of the problems or attain a part or all of the effects. Unless the technical features are explained as essential technical features in this specification, the technical features can be deleted as appropriate.

The entire disclosure of Japanese Patent Application No. 2014-264142, filed Dec. 26, 2014 is expressly incorporated by reference herein.

What is claimed is:

1. A transmission type head-mounted display device comprising:
   a sound sensor configured to acquire sound from an outside environment of the head-mounted display device;
   an image display capable of displaying an image and capable of transmitting an outside scene;
   a memory storing: (i) a plurality of execution function images corresponding to respective functions executable by the head-mounted display device, and (ii) a plurality of specific sound images corresponding to respective sounds;

a processor or integrated circuit programmed to:
cause the image display to display a combined image in a first form, the combined image in the first form being obtained through combining one of the plurality of execution function images and one of the plurality of specific sound images;
identify a specific sound corresponding to the specific sound image being displayed as a part of the combined image on the image display from sound data acquired by the sound sensor;
in response to the identified specific sound, execute the function corresponding to the execution function image combined with the specific sound image displayed as a part of the combined image; and
when a predetermined time elapses without identifying the specific sound after the combined image in the first form is displayed, cause the image display to display the combined image in a second form such that the execution function image at least partially disappears and the specific sound images is kept displayed.

2. The head-mounted display device according to claim 1, wherein
a function executed by the processor or integrated circuit is an intermediate function for enabling selection of a plurality of functions associated with the function to be executed, and
when the intermediate function is executed, the processor or integrated circuit causes the image display to display a plurality of the execution function images representing the plurality of functions associated with the executed intermediate function and the combined image obtained by combining each of the plurality of execution function images and the specific sound image.

3. The head-mounted display device according to claim 1, further comprising:
a motion detector configured to detect a motion of the user, wherein
the processor or integrated circuit selects, on the basis of a combination of the detected motion of the user and the acquired specific sound, the execution function image displayed on the image display.

4. The head-mounted display device according to claim 3, wherein the motion detector detects a motion of the head of the user.

5. The head-mounted display device according to claim 1, wherein the specific sound image is an image having a region displayed on the image display smaller than a region of the execution function image.

6. The head-mounted display device according to claim 1, wherein the specific sound image is one of an image representing a direction and an image displayed in a color different from a color of another kind of the specific sound image.

7. The head-mounted display device according to claim 1, wherein, when a different plurality of the combined images are displayed on the image display, each of specific sound images combined with each of the plurality of images is unrelated to a function of the head-mounted display device to be executed and is formed by different words included in a same category.

8. The head-mounted display device according to claim 1, further comprising
a receiver/transmitter capable of transmitting and receiving information to and from another device, wherein the execution function image includes another device control image representing a function executable by another device capable of transmitting and receiving the information, and
the processor or integrated circuit causes the another device to execute a function executable by the other device control image combined with the specific sound image associated with the acquired specific sound.

9. The head-mounted display device according to claim 1, wherein the processor or integrated circuit causes the image display to display the combined image in a region excluding a center in an image display region where the image display can display an image.

10. The head-mounted display device according to claim 1, wherein the processor or integrated circuit causes the head-mounted display device to execute a function executable by the execution function image combined with the specific sound image associated with the acquired specific sound.

11. The head-mounted display device according to claim 1, wherein
the selection group image includes at least two or more execution function images that each correspond to a different function.

12. A control method for a transmission type head-mounted display device including an image display capable of displaying an image and capable of transmitting an outside scene and a memory storing: (i) a plurality of execution function images corresponding to respective functions executable by the head-mounted display device, and (ii) a plurality of specific sound images corresponding to respective sounds, the control method comprising:
acquiring sound from an outside environment of the head-mounted display device;
causing the image display to display a combined image in a first form, the combined image in the first form being obtained through combining one of the plurality of execution function images and one of the plurality of specific sound images;
identifying a specific sound corresponding to the specific sound image being displayed as a part of the combined image on the image display from sound data acquired by the sound sensor;
in response to the identified specific sound, executing the function corresponding to the execution function image combined with the specific sound image displayed as a part of the combined image; and
when a predetermined time elapses without identifying the specific sound after the combined image in the first form is displayed, causing the image display to display the combined image in a second form such that the execution function image at least partially disappears and the specific sound images is kept displayed.

13. The control method according to claim 12, wherein
the selection group image includes at least two or more execution function images that each correspond to a different function.

14. A non-transitory computer readable storage medium storing a computer program for a transmission type head-mounted display device including an image display capable of displaying an image and capable of transmitting an outside scene and a memory storing: (i) a plurality of execution function images corresponding to respective functions executable by the head-mounted display device, and (ii) a plurality of specific sound images corresponding to respective sounds, the computer program causing a computer to perform steps comprising:

acquiring sound from an outside environment of the head-mounted display device;

causing the image display to display a combined image in a first form, the combined image in the first form being obtained through combining one of the plurality of execution function images and one of the plurality of specific sound images;

identifying a specific sound corresponding to the specific sound image being displayed as a part of the combined image on the image display from sound data acquired by the sound sensor;

in response to the identified specific sound, executing the function corresponding to the execution function image combined with the specific sound image displayed as a part of the combined image; and when a predetermined time elapses without identifying the specific sound after the combined image in the first form is displayed, causing the image display to display the combined image in a second form such that the execution function image at least partially disappears and the specific sound images is kept displayed.

15. The non-transitory computer readable storage medium according to claim 14, wherein the selection group image includes at least two or more execution function images that each correspond to a different function.

* * * * *